United States Patent
Mitarai et al.

(10) Patent No.: US 9,429,418 B2
(45) Date of Patent: Aug. 30, 2016

(54) INFORMATION PROCESSING METHOD AND INFORMATION PROCESSING APPARATUS

(75) Inventors: Yusuke Mitarai, Tokyo (JP);
Masakazu Matsugu, Yokohama (JP);
Hiroto Yoshii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 13/580,560

(22) PCT Filed: Feb. 22, 2011

(86) PCT No.: PCT/JP2011/000965
§ 371 (c)(1),
(2), (4) Date: Aug. 22, 2012

(87) PCT Pub. No.: WO2011/105044
PCT Pub. Date: Sep. 1, 2011

(65) Prior Publication Data
US 2012/0321173 A1 Dec. 20, 2012

(30) Foreign Application Priority Data
Feb. 25, 2010 (JP) .................. 2010-040596

(51) Int. Cl.
*G06K 9/00* (2006.01)
*G01B 11/03* (2006.01)
(Continued)

(52) U.S. Cl.
CPC .............. *G01B 11/03* (2013.01); *G01B 11/26* (2013.01); *G06T 7/0042* (2013.01); *G06T 15/205* (2013.01); *G06T 2207/30204* (2013.01); *G06T 2207/30244* (2013.01)

(58) Field of Classification Search
None
See application file for complete search history.

(56) References Cited

U.S. PATENT DOCUMENTS 4,920,491 A * 4/1990 Eberhard ............. G01N 23/046
378/901
5,160,848 A * 11/1992 Saitoh .................. G03F 9/7049
250/548
(Continued)

FOREIGN PATENT DOCUMENTS

JP 2000-194859 A 7/2000
JP 2003-296708 A 10/2003
(Continued)

OTHER PUBLICATIONS

Journal Aiger, 4 points congruent sets for robust pairwise surface registration, ACM Transactions on Graphics (TOG)—Proceedings of ACM SIGGRAPH 2008, vol. 27 Issue 3, Aug. 2008 Article No. 85.*
(Continued)

*Primary Examiner* — Chan Park
*Assistant Examiner* — Iman K Kholdebarin
(74) *Attorney, Agent, or Firm* — Canon USA, Inc. I.P. Division

(57) ABSTRACT

A multi view-point image composed of a great number of images according to a shape of an object is generated or an information processing method used for generating a three-dimensional model or performing image processing of arbitrary view-point object recognition is provided, and based on a plurality of captured images obtained by imaging of the object from a plurality of view points by an imaging means, a relative position and orientation with respect to the object relative to the imaging means for each of the plurality of view points is calculated, and based on the calculated plurality of relative positions and orientations, a missing position and orientation of the imaging means in a direction in which imaging by the imaging means is missing is calculated, and an image used for displaying the calculated missing position and orientation on a display means is generated.

25 Claims, 13 Drawing Sheets

(51) Int. Cl.
*G01B 11/26* (2006.01)
*G06T 15/20* (2011.01)
*G06T 7/00* (2006.01)

(56) References Cited

U.S. PATENT DOCUMENTS

| | | | | |
|---|---|---|---|---|
| 5,225,892 A * | 7/1993 | Matsugu | ............... | G03F 9/7076 250/548 |
| 5,291,563 A * | 3/1994 | Maeda | ............... | G06K 9/52 348/135 |
| 5,319,444 A * | 6/1994 | Saitoh | ............... | G03F 9/7049 250/548 |
| 5,327,221 A * | 7/1994 | Saitoh | ............... | G03F 9/7049 356/509 |
| 5,340,992 A * | 8/1994 | Matsugu | ............... | G03F 9/7076 250/548 |
| 5,481,363 A * | 1/1996 | Matsugu | ............... | G03F 9/7076 356/401 |
| 5,625,408 A * | 4/1997 | Matsugu | ............... | G06T 7/0022 348/231.6 |
| 5,734,743 A * | 3/1998 | Matsugu | ............... | G06T 1/00 382/154 |
| 5,973,726 A * | 10/1999 | Iijima | ............... | H04N 5/2624 348/36 |
| 6,118,475 A * | 9/2000 | Iijima | ............... | G01C 11/06 348/42 |
| 6,167,167 A * | 12/2000 | Matsugu | ............... | H04N 19/503 358/538 |
| 6,404,936 B1 * | 6/2002 | Katayama | ............... | G06T 7/0081 345/626 |
| 6,445,814 B2 * | 9/2002 | Iijima | ............... | G06T 7/0065 348/46 |
| 6,453,069 B1 * | 9/2002 | Matsugu | ............... | G06K 9/48 382/173 |
| 6,463,176 B1 * | 10/2002 | Matsugu | ............... | G06K 9/00268 382/195 |
| 6,621,921 B1 * | 9/2003 | Matsugu | ............... | G06T 7/0042 382/154 |
| 6,636,635 B2 * | 10/2003 | Matsugu | ............... | G06K 9/20 382/218 |
| 6,654,497 B1 * | 11/2003 | Kondo | ............... | G06T 7/0085 382/195 |
| 6,674,902 B1 * | 1/2004 | Kondo | ............... | G06T 7/0083 382/103 |
| 6,674,905 B1 * | 1/2004 | Matsugu | ............... | G06T 7/0081 382/181 |
| 6,757,444 B2 * | 6/2004 | Matsugu | ............... | H04N 19/503 358/538 |
| 6,766,055 B2 * | 7/2004 | Matsugu | ............... | G06K 9/48 382/173 |
| 6,823,080 B2 * | 11/2004 | Iijima | ............... | G06T 7/0065 348/42 |
| 6,826,299 B2 * | 11/2004 | Brown | ............... | G01B 11/2545 345/419 |
| 6,839,081 B1 * | 1/2005 | Iijima | ............... | G06T 7/0071 348/36 |
| 6,907,140 B2 * | 6/2005 | Matsugu | ............... | G06K 9/00268 382/195 |
| 6,987,535 B1 * | 1/2006 | Matsugu | ............... | G06F 3/04845 348/239 |
| 6,993,184 B2 * | 1/2006 | Matsugu | ............... | G06K 9/20 382/173 |
| 7,054,850 B2 * | 5/2006 | Matsugu | ............... | G06K 9/4628 706/20 |
| 7,088,860 B2 * | 8/2006 | Matsugu | ............... | G06K 9/00281 348/222.1 |
| 7,512,271 B2 * | 3/2009 | Matsugu | ............... | G06K 9/00281 348/222.1 |
| 7,545,901 B2 * | 6/2009 | Mistretta | ............... | G06T 11/006 378/4 |
| 8,306,265 B2 * | 11/2012 | Fry | ............... | A61B 5/0452 348/143 |
| 8,380,013 B2 * | 2/2013 | Hisanaga | ............... | G06F 19/321 382/128 |
| 8,542,236 B2 * | 9/2013 | Sullivan | ............... | G06T 13/40 345/473 |
| 8,559,702 B2 * | 10/2013 | Kochi | ............... | G01C 11/02 345/420 |
| 8,634,635 B2 * | 1/2014 | Bai | ............... | A01K 29/005 382/154 |
| 8,737,720 B2 * | 5/2014 | Mas | ............... | G06K 9/00664 345/419 |
| 8,750,632 B2 * | 6/2014 | Nakamura | ............... | H04N 19/597 382/154 |
| 8,761,440 B2 * | 6/2014 | Honjo | ............... | G01B 11/2513 356/610 |
| 2001/0014171 A1 * | 8/2001 | Iijima | ............... | G06T 7/0065 382/154 |
| 2002/0038294 A1 * | 3/2002 | Matsugu | ............... | G06K 9/4628 706/20 |
| 2002/0044691 A1 * | 4/2002 | Matsugu | ............... | G06K 9/20 382/218 |
| 2002/0081019 A1 * | 6/2002 | Katayama | ............... | G06K 9/209 382/154 |
| 2002/0164067 A1 * | 11/2002 | Askey | ............... | G06T 17/20 382/154 |
| 2002/0164074 A1 * | 11/2002 | Matsugu | ............... | G06K 9/48 382/173 |
| 2002/0181799 A1 * | 12/2002 | Matsugu | ............... | G06K 9/00281 382/260 |
| 2003/0007680 A1 * | 1/2003 | Iijima | ............... | G06T 7/0065 382/154 |
| 2003/0044073 A1 * | 3/2003 | Matsugu | ............... | G06K 9/00268 382/195 |
| 2003/0099397 A1 * | 5/2003 | Matsugu | ............... | H04N 19/503 382/173 |
| 2003/0198378 A1 * | 10/2003 | Ng | ............... | G06K 9/20 382/154 |
| 2004/0055794 A1 * | 3/2004 | Akatsuka | ............... | H04N 5/2224 178/18.01 |
| 2004/0066970 A1 * | 4/2004 | Matsugu | ............... | G06K 9/20 382/217 |
| 2004/0109602 A1 * | 6/2004 | Konno | ............... | G01N 21/95684 382/150 |
| 2005/0117215 A1 * | 6/2005 | Lange | ............... | G02B 27/22 359/462 |
| 2005/0140803 A1 * | 6/2005 | Ohtsuka | ............... | H04N 5/2621 348/239 |
| 2005/0232509 A1 * | 10/2005 | Blake | ............... | G06K 9/03 382/275 |
| 2006/0017722 A1 * | 1/2006 | Hong | ............... | G06T 15/04 345/419 |
| 2006/0115157 A1 * | 6/2006 | Mori | ............... | G06K 9/00221 382/190 |
| 2006/0204053 A1 * | 9/2006 | Mori | ............... | G06K 9/00 382/118 |
| 2006/0222214 A1 * | 10/2006 | Kaneda | ............... | G06K 9/00335 382/115 |
| 2006/0228027 A1 * | 10/2006 | Matsugu | ............... | G06K 9/00281 382/181 |
| 2006/0239539 A1 * | 10/2006 | Kochi | ............... | G01C 11/02 382/154 |
| 2006/0255986 A1 * | 11/2006 | Takanezawa | ............... | G08B 13/196 341/67 |
| 2007/0025722 A1 * | 2/2007 | Matsugu | ............... | G03B 17/16 396/263 |
| 2007/0122028 A1 * | 5/2007 | Sun | ............... | G06K 9/32 382/154 |
| 2007/0122036 A1 * | 5/2007 | Kaneda | ............... | G06K 9/00281 382/190 |
| 2007/0242856 A1 * | 10/2007 | Suzuki | ............... | G06K 9/00275 382/103 |
| 2008/0002862 A1 * | 1/2008 | Matsugu | ............... | G06K 9/00248 382/115 |
| 2008/0111881 A1 * | 5/2008 | Gibbs | ............... | H04N 5/2259 348/36 |
| 2008/0181508 A1 * | 7/2008 | Kaneda | ............... | G06K 9/00248 382/190 |
| 2008/0186311 A1 * | 8/2008 | Claus | ............... | A61B 6/032 345/420 |
| 2008/0187090 A1 * | 8/2008 | Kalke | ............... | G06T 11/006 378/4 |

(56) References Cited

U.S. PATENT DOCUMENTS

| | | | |
|---|---|---|---|
| 2009/0169101 A1* | 7/2009 | Mitarai | G06K 9/0061 382/167 |
| 2010/0103249 A1* | 4/2010 | Lipton | H04N 13/0022 348/51 |
| 2010/0189358 A1* | 7/2010 | Kaneda | G06K 9/00744 382/195 |
| 2010/0220338 A1* | 9/2010 | Ota | G01B 11/30 356/601 |
| 2010/0256818 A1* | 10/2010 | Aoba | B25J 9/1612 700/275 |
| 2010/0310155 A1* | 12/2010 | Newton | H04N 13/0055 382/154 |
| 2011/0037984 A1* | 2/2011 | Yoshikawa | G01N 21/4738 356/445 |
| 2011/0050864 A1* | 3/2011 | Bond | H04N 13/026 348/51 |
| 2011/0206237 A1* | 8/2011 | Saruta | G01B 11/00 382/103 |
| 2011/0229020 A1* | 9/2011 | Yoshii | G06K 9/6282 382/159 |
| 2011/0261050 A1* | 10/2011 | Smolic | G06T 15/20 345/419 |
| 2012/0033853 A1* | 2/2012 | Kaneda | G06K 9/00597 382/103 |
| 2012/0045095 A1* | 2/2012 | Tate | G06T 5/003 382/103 |
| 2012/0105868 A1* | 5/2012 | Nomura | G01B 11/25 356/610 |
| 2012/0113268 A1* | 5/2012 | Ito | H04N 5/2251 348/169 |
| 2012/0155706 A1* | 6/2012 | Honjo | G01B 11/2513 382/103 |
| 2012/0158180 A1* | 6/2012 | Iio | B25J 9/1679 700/259 |
| 2012/0163672 A1* | 6/2012 | McKinnon | G06T 7/0075 382/106 |
| 2012/0182392 A1* | 7/2012 | Kearns | B25J 11/009 348/46 |
| 2012/0321173 A1* | 12/2012 | Mitarai | G01B 11/03 382/154 |
| 2012/0327224 A1* | 12/2012 | Nomura | B25J 9/1671 348/139 |
| 2013/0100131 A1* | 4/2013 | Berechet | G06T 17/05 345/420 |
| 2013/0142430 A1* | 6/2013 | Okuno | G06K 9/18 382/182 |
| 2013/0201182 A1* | 8/2013 | Kuroki | G06T 19/20 345/419 |
| 2013/0286047 A1* | 10/2013 | Katano | G02B 27/0101 345/633 |
| 2013/0294684 A1* | 11/2013 | Lipton et al. | 382/154 |
| 2013/0343634 A1* | 12/2013 | Xu | G06K 9/36 382/154 |
| 2014/0043329 A1* | 2/2014 | Wang | G06T 17/20 345/420 |
| 2014/0198962 A1* | 7/2014 | Anabuki | G06T 7/0014 382/128 |
| 2015/0036879 A1* | 2/2015 | Shiozaki | G06T 7/0046 382/103 |
| 2015/0189144 A1* | 7/2015 | Yoshii | H04N 5/2351 348/46 |
| 2015/0235109 A1* | 8/2015 | Yoshii | G06K 9/6255 382/159 |

FOREIGN PATENT DOCUMENTS

| | | |
|---|---|---|
| JP | 2004-139294 A | 5/2004 |
| JP | 2005-195335 A | 7/2005 |
| JP | 2007-072537 A | 3/2007 |
| JP | 2007-156528 A | 6/2007 |

OTHER PUBLICATIONS

Xiaoguang Wang, Recovering facade texture and microstructure from real world images, Proc 2nd international workshop, 2002, pp. 145-149.*

V.Lepetit, F.Moreno-Noguer, P.Fua "EPnP: An Accurate O(n) Solution to the PnP Problem", International Journal of Computer Vision.

G.Reitmayr, T.W.Drummond, "Going out: Robust Model-based Tracking for Outdoor Augmented Reality".

Shingo Ando, Yoshinori Kusachi, Akira Suzuki, Kenichi Arakawa, "Pose Estimation of 3D Object Using Support Vector Regression", Journal of the Institute of Electronics, Information and Communication Engineers D, vol. J89-D, pp. 1840-1847, 2006.

Hiroshi Murase, S.K.Nayar, "3D Object Recognition from Appearance: Parametric Eigenspace Method", The Institute of Electronics, Information and Communication Engineers D-II, vol. J77-D-2(11), pp. 2179-2187, 1994.

S.M.Seitz, C.R.Dyer, "View Morphing"; Department of Computer Sciences, University of Wisconsin.

* cited by examiner

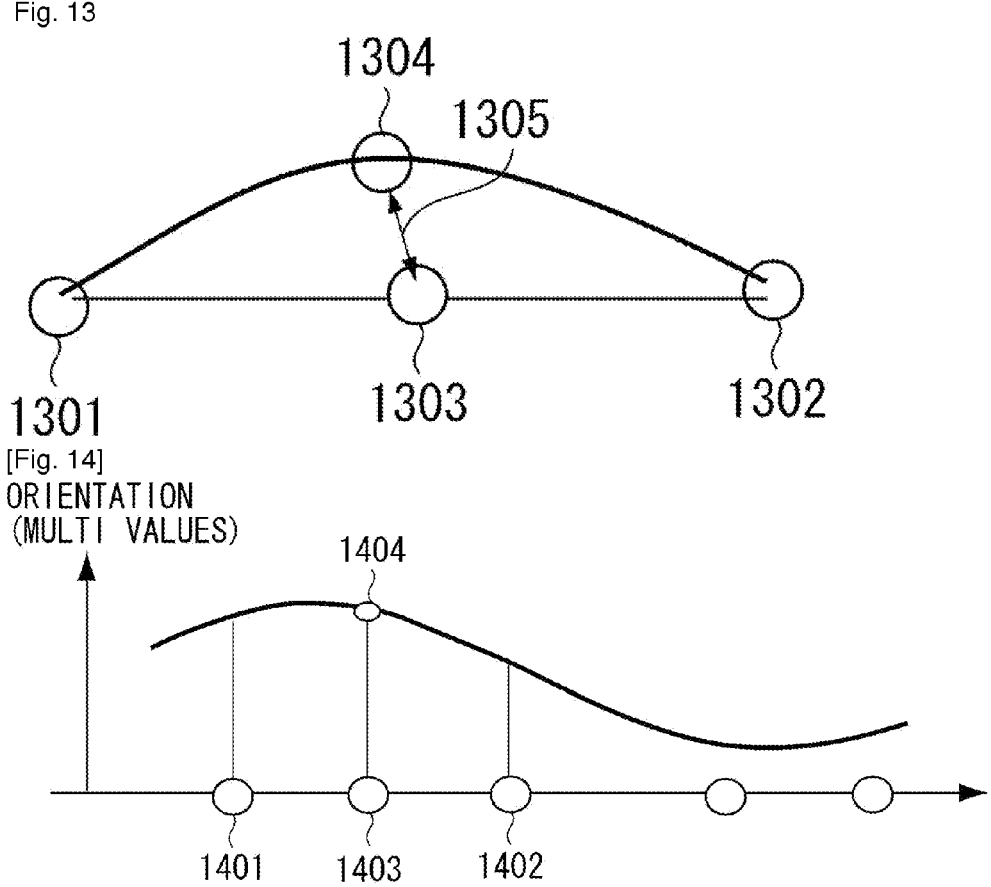

INFORMATION PROCESSING METHOD AND INFORMATION PROCESSING APPARATUS

TECHNICAL FIELD

The present invention relates to a method for generating a multi view-point image composed of a great number of images of a three-dimensional object captured from a plurality of different view points.

BACKGROUND ART

In generating a three-dimensional model by using an image which is obtained by imaging a three-dimensional object, a great number of images captured from various view points are necessary. Further, with respect to recognition of a three-dimensional object by using an image which is obtained by imaging the three-dimensional object from an arbitrary view point or with respect to learning of a classifier that recognizes the three-dimensional object, it is useful to use a great number of images captured from various view points. The learning of the classifier is to set or adjust a parameter of the classifier by using a great amount of data that continually increases according to learning. According to learning, optimum control is realized while adjustment is being made. Various methods have been proposed so far as a method for acquiring a great number of images obtained by imaging an object from various view points.

Japanese Patent Laid-Open No. 2007-72537 discusses an imaging apparatus including a plurality of imaging apparatuses and a rotation base where an object is mounted. The imaging apparatus references a feature point of the object. According to such an apparatus, the orientation of the object can be changed and a complete periphery image of the object can be captured.

Japanese Patent Laid-Open No. 2004-139294 discusses a multi view-point image processing program using a plurality of markers each of which serves as a reference of a view point position. According to such a method, as is with patent literature 1, without using a large-scale imaging apparatus, images of an object captured according to imaging from various view points can be acquired.

Regarding generation of a highly-accurate three-dimensional model or learning of a classifier that performs arbitrary view-point object recognition, it is desirable if a great number of images can be acquired which is performed by imaging the object evenly from various view points. However, with respect to the above-described method, an optimum method for evenly imaging the object from various view points is not provided or a simple method for realizing such imaging is not provided.

Further, with respect to generation of an improved three-dimensional model or improved learning of a classifier that performs arbitrary view-point object recognition, it is useful if the image is acquired according to a shape of the object. For example, it is useful if an image of a portion whose structure is complex is acquired in detail from a number of view points. However, the portion of the view points which should be densely arranged in capturing a portion of the object is not clear. Further, even if a portion where view points should be densely arranged is given, a method for simply acquiring such an image is not provided.

CITATION LIST

Patent Literature

PTL 1: Japanese Patent Laid-Open No. 2007-72537
PTL 2: Japanese Patent Laid-Open No. 2004-139294
PTL 3: Japanese Patent Laid-Open No. 2007-156528
PTL 4: Japanese Patent Laid-Open No. 2000-194859

Non Patent Literature

NPL 1: V. Lepetit, F. Moreno-Noguer, P. Fua "EPnP: An Accurate O(n) Solution to the PnP Problem", International Journal of Computer Vision, Vol. 81, No. 2, pp. 155-166, 2008
NPL 2: G. Reitmayr, T. W. Drummond, "Going out: Robust Model-based Tracking for Outdoor Augmented Reality", IEEE/ACM International Symposium on Mixed and Augmented Reality, pp. 109-118, 2006
NPL 3: Shingo Ando, Yoshinori Kusachi, Akira Suzuki, Kenichi Arakawa, "Pose Estimation of 3D Object Using Support Vector Regression", Journal of The Institute of Electronics, Information and Communication Engineers D, Vol. J89-D, pp. 1840-1847, 2006
NPL 4: Hiroshi Murase, S. K. Nayar, "3D Object Recognition from Appearance: Parametric Eigenspace Method", The Institute of Electronics, Information and Communication Engineers D-II, Vol. J77-D-2(11), pp. 2179-218'7, 1994
NPL 5: S. M. Seitz, C. R. Dyer, "View Morphing", Proceedings of SIGGRAPH 96, pp. 21-30, 1996

SUMMARY OF INVENTION

In the present invention, an image which is missing in object recognition is presented by using a great number of images obtained by imaging an object from various view points.

In accordance with a first aspect of the present invention, an information processing apparatus includes a relative position and orientation calculation means configured to calculate, based on a plurality of images captured by imaging an object from a plurality of view points by an imaging means, a relative position and orientation with respect to the object relative to the imaging means for each of the plurality of view points, a missing position and orientation calculation means configured to calculate a missing position and orientation of the imaging means from which imaging by the imaging means is missing based on the calculated plurality of relative positions and orientations, and a missing view-point image generation means configured to generate an image used for displaying the calculated missing position and orientation on a display means.

In accordance with another aspect of the present invention, an information processing method performed by an information processing apparatus includes a relative position and orientation calculation means of the information processing apparatus calculating, based on a plurality of images captured by imaging an object from a plurality of view points by an imaging means, a relative position and orientation with respect to the object relative to the imaging means for each of the plurality of view points, a missing position and orientation calculation means of the information processing apparatus calculating a missing position and orientation of the imaging means from which imaging by the imaging means is missing based on the calculated plurality of relative positions and orientations, and a missing view-point image generation means of the information processing apparatus generating an image used for display of the calculated missing position and orientation on a display means.

In accordance with a still further aspect of the present invention, a program causes a computer to execute each step of one of the video information processing methods described above.

In accordance with another aspect of the present invention, a recording medium stores a program causing a computer to execute each step of one of the video information processing methods described above.

Further features of the present invention will be apparent from the following description of exemplary embodiments with reference to the attached drawings.

BRIEF DESCRIPTION OF DRAWINGS

FIG. 13 illustrates an example of missing view point determination based on comparison of two images.

FIG. 14 illustrates an example of missing view point determination based on an orientation estimation result.

DESCRIPTION OF EMBODIMENTS

It should be noted that the relative arrangement of the components, the numerical expressions and numerical values set forth in these embodiments do not limit the scope of the present invention unless it is specifically stated otherwise.

Exemplary Embodiments of the present invention will now be described in detail below with reference to the accompanying drawings.

According to a first exemplary embodiment, a multi view-point image is generated from a great number of images obtained by evenly imaging an object being a measurement object from various view points.

Figure 1:
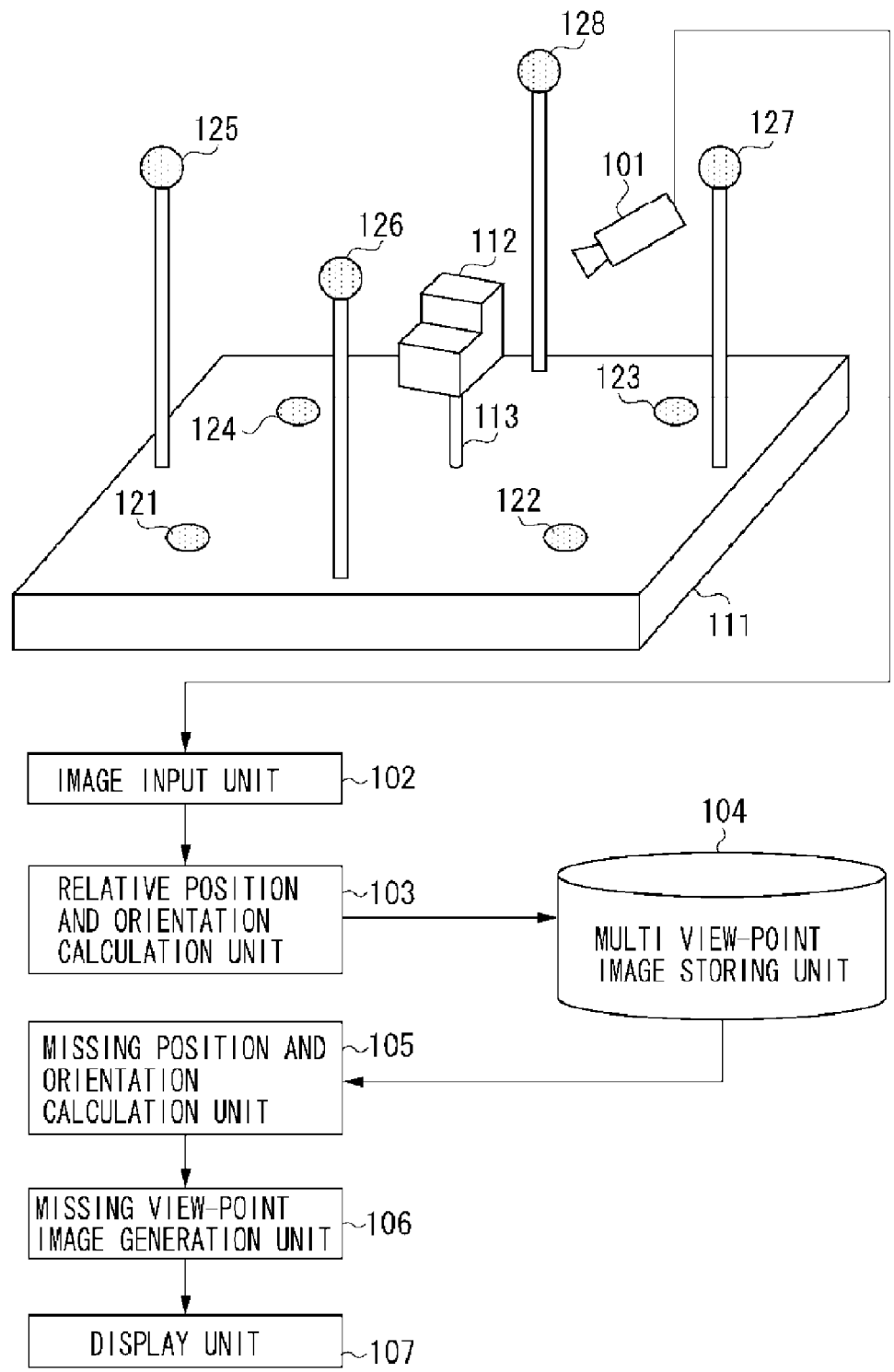
FIG. 1 is a configuration diagram according to a first exemplary embodiment.

FIG. 1 is a configuration diagram according to the present embodiment. The present embodiment includes an imaging unit 101, an image input unit 102, a relative position and orientation calculation unit 103, a multi view-point image storage unit 104, a missing position and orientation calculation unit 105, a missing view-point image generation unit 106, and a display unit 107. Further, on a measurement base 111 set in the real space, an object 112 being a measurement object is set on a support 113. A plurality of markers 121, 122, ..., 128 are arranged in the periphery of the object 112. Further, the eight markers of the markers 121 to 128 correspond to color 1, color 2, ..., color 8 respectively.

The imaging unit 101 performs imaging of the object 112. For example, imaging of the object 112 mounted on the support 113 is performed by a camera operated by a user. The imaging unit 101 can externally output the image which has been captured. For example, the imaging unit is a digital still camera or a camcorder including an image sensor, such as a charge-coupled device (CCD), and a lens. The captured image is transmitted to the image input unit 102 when, for example, the user presses a shutter button of the digital still camera.

The image input unit 102 inputs the image transmitted from the imaging unit 101. The image input by the image input unit 102 is transmitted to the relative position and orientation calculation unit 103.

The relative position and orientation calculation unit 103 calculates a relative position and orientation of the object 112 which is a measurement object, and the imaging unit 101. The relative position and orientation of the object 112 and the imaging unit 101 calculated by the relative position and orientation calculation unit 103 is transmitted to the multi view-point image storage unit 104.

The multi view-point image storage unit 104 stores the imaging orientation data obtained by the relative position and orientation calculation unit 103 in association with the image according to which the measurement of the imaging orientation has been performed. The storing operation is repeated until the number of the imaging orientation data pieces reaches a predetermined number. The recorded imaging orientation data is transmitted to the missing position and orientation calculation unit.

The missing position and orientation calculation unit 105 calculates an imaging-missing view point at the current stage based on a great amount of imaging orientation data obtained by imaging up to the current stage and stored in the multi view-point image storage unit 104.

The missing view-point image generation unit 106 generates an image showing the view point which is missing from the imaging orientation data of the missing view points calculated by the missing position and orientation calculation unit 105.

The display unit 107 displays the display image generated by the missing view-point image generation unit 106.

Figure 2:
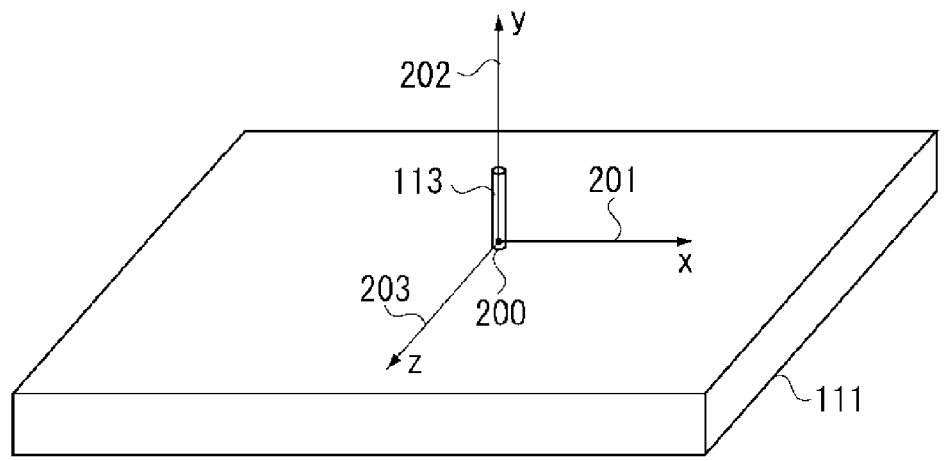
FIG. 2 illustrates a definition of a measurement coordinate system according to the first exemplary embodiment.

FIG. 2 illustrates a definition of a measurement coordinate system according to the present embodiment. The support 113 is where a measurement object is mounted. The support 113 is provided on the measurement base 111. The point of origin of the measurement coordinate system is a contact position 200 where the support 113 contacts the measurement base 111, and the axes are an x-axis 201, a y-axis 202, and a z-axis 203.

When the image captured by the imaging unit 101 is processed, the markers are uniquely identified. For example, if the markers have different colors and their three-dimensional positions are known, a color unique to each marker is extracted from the image captured by the imaging unit 101. According to this processing, a marker in the image can be identified and the position of the marker in the image can be detected. A three-dimensional position of each marker is fixed and a center position of the markers in the measurement coordinate system is measured in advance.

Figure 3:
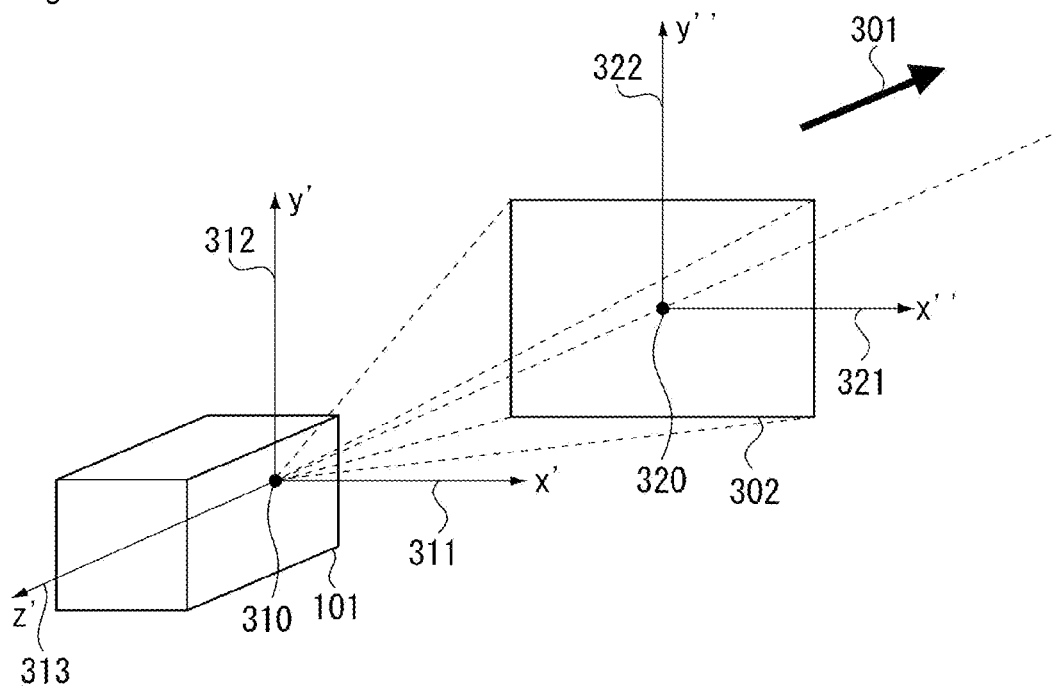
FIG. 3 illustrates definition of a camera coordinate system and an image coordinate system according to the first exemplary embodiment.

FIG. 3 illustrates a definition of a camera coordinate system and an image coordinate system. As is with the measurement coordinate system, a three-dimensional camera coordinate system is defined with respect to the imaging unit 101. Further, an image plane 302 which is a virtual plane corresponding to the captured image is defined, and a two-dimensional image coordinate system of the image plane is defined. A principal point of the lens of the imaging unit 101 in the camera coordinate system is a point of origin 310. The direction corresponding to the right direction with respect to the captured image is defined as an x'-axis 311, the direction corresponding to the upper direction is defined as a y'-axis 312, and the axis parallel to the optical axis of the lens and in a direction opposite to an imaging direction 301 of the imaging unit 101 is defined as a z'-axis 313. Further, the image coordinate system is defined, as is illustrated in FIG. 3, as a two-dimensional coordinate system. In this image coordinate system, the center of an image plane 302 is defined as a point of origin 320, the direction corresponding to the right direction of the image is defined as an x"-axis 321, and the direction corresponding to the upper direction is defined as a y"-axis 322.

Figure 4:
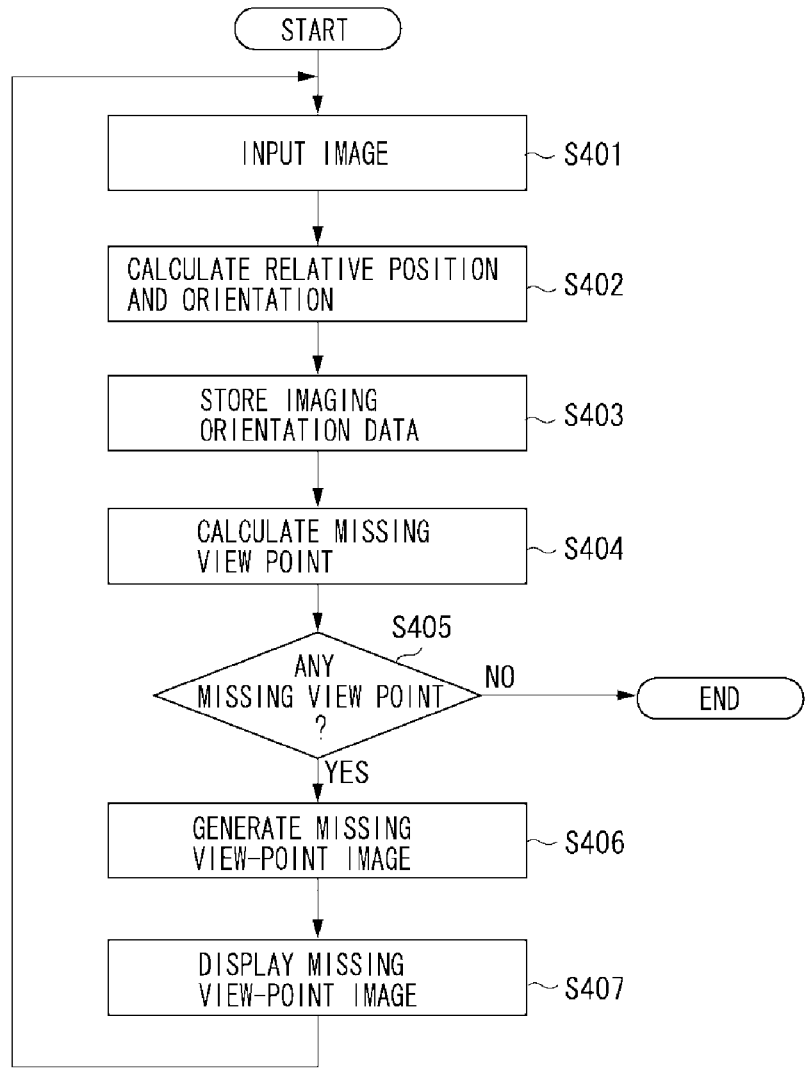
FIG. 4 is a flowchart illustrating processing according to the first exemplary embodiment.

FIG. 4 is a flowchart illustrating processing according to the present embodiment. An example of a multi view-point image generation method will be described.

In step S401, the image input unit 102 inputs an image transmitted from the imaging unit 101 to the relative position and orientation calculation unit 103. The image obtained by imaging the object 112 needs to include at least four markers in the image. The image input by the image input unit 102 is transmitted to the relative position and orientation calculation unit 103 and the processing proceeds to step S402.

In step S402, the relative position and orientation calculation unit 103 calculates a relative position and orientation of the object 112 which is a measurement object and the imaging unit 101. In other words, by processing the image transmitted from the image input unit 102, the relative position and orientation calculation unit 103 measures a position and orientation of the imaging unit when the imaging unit captured the image.

When the image is transmitted, the relative position and orientation calculation unit extracts the colors 1 to 8, each of which is unique to each marker, and determines whether each marker is included in the image. To be more precise, a hue is obtained from RGB values of each pixel and if the obtained hue and the hue of the color to be extracted are within a predetermined range, that pixel is extracted. If a pixel of a corresponding color is extracted from the image, it is determined that a marker corresponding to that color is included in the image. Then, a barycentric position (position (x", y") in the above-described image coordinate system) with respect to the image of the pixel corresponding to the color of the marker is obtained. According to this processing, positions of four or more markers, whose three-dimensional positions in the measurement coordinate system are known, in the image coordinate system can be obtained. Further, if a focal length of the lens is known as f [mm], according to a technique discussed in nonpatent literature 1, a relative position and orientation of the camera coordinate system with respect to the measurement coordinate system can be obtained.

A relative position and orientation of two three-dimensional coordinate systems is expressed by two components of the coordinate system, which are a translational component and a rotational component. The translational component is a translational mobile component between two points of origin of the two three-dimensional coordinates and is expressed by a translational mobile component (Tx, Ty, Tz) from a point of origin 40 of the measurement coordinate system to the point of origin 310 of the camera coordinate system. The rotational component is expressed by an axis of rotation and an amount of rotation with respect to the axis of rotation. To be more precise, the relative position and orientation of the two three-dimensional coordinate systems is expressed by the amount of rotation when the x-axis 201, the y-axis 202, and the z-axis 203 of the measurement coordinate system are in the same directions as the x'-axis 311, the y'-axis 312, and the z'-axis 313 of the camera coordinate system respectively. In other words, the measurement coordinate system is expressed by a direction of the axis of rotation (Rx, Ry, Rz) and a rotation angle "theta" when the measurement coordinate system is rotated on the axis of rotation which passes through the origin of the measurement coordinate system. Since the rotational component consists of four parameters and the parameters are normalized so that (Rx, Ry, Rz) that express the direction of the axis of rotation satisfy Rx2+Ry2+Rz2=1, the actual degree of freedom will be the same as the degree of freedom of the rotation. The measured relative position and orientation is expressed by the translational component (Tx, Ty, Tz) and the rotational component between the coordinate systems. The rotational component is expressed by the direction of the axis of rotation (Rx, Ry, Rz) and the rotation angle "theta". The relative position and orientation is used as the imaging orientation data.

The relative position and orientation of the object 112 and the imaging unit 101 calculated by the relative position and orientation calculation unit 103 is transmitted to the multi view-point image storage unit 104 and then the processing proceeds to step S403.

In step S403, the multi view-point image storage unit 104 stores the imaging orientation data obtained by the relative position and orientation calculation unit 103 in association with the image according to which the measurement of the imaging orientation has been performed. In other words, the image of the object 112 which has been captured by the user and the position and orientation of the imaging unit 101 when the image has been captured are stored in the multi view-point image storage unit 104. When they are stored, they are associated to each other. This process is repeated until the number of the data pieces of the imaging orientation data stored in association reaches a predetermined number, and then the processing proceeds to step S404. The imaging is repeated until, for example, about 60 pieces of data are obtained.

In step S404, the missing position and orientation calculation unit 105 calculates the imaging-missing view point at the current stage based on a great amount of imaging orientation data captured by that time and stored in the multi view-point image storage unit 104.

Figure 5:
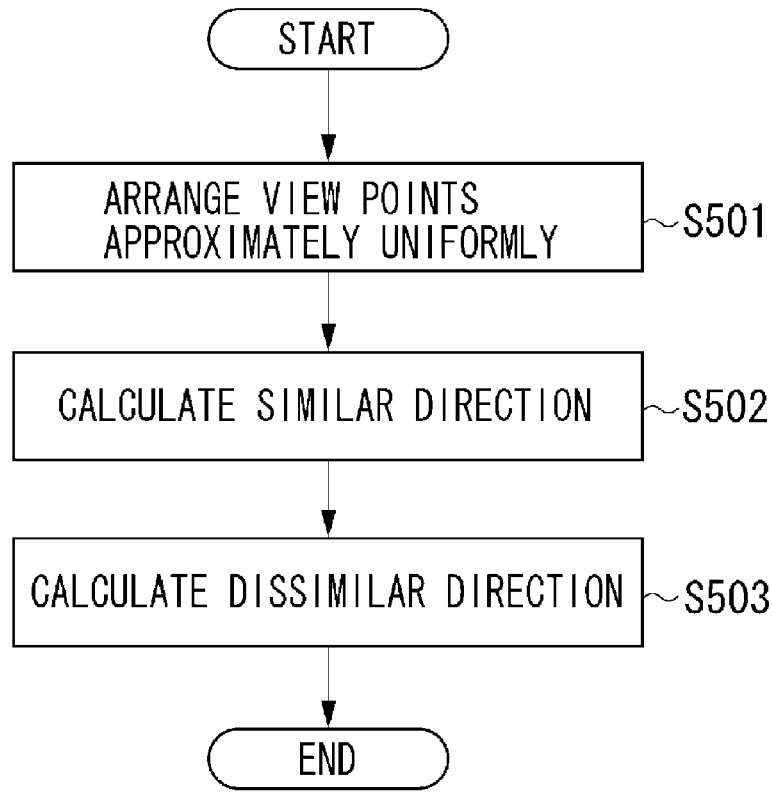
FIG. 5 is a flowchart illustrating processing performed by a missing position and orientation calculation unit according to the first exemplary embodiment.

FIG. 5 is a flowchart illustrating processing performed by the missing position and orientation calculation unit. Details of the actual processing performed by the missing position and orientation calculation unit 105 in step S404 will be described.

Step S501 is an approximately uniform direction calculation step. In this step, virtual view points are approximately uniformly arranged on a sphere in a virtual three-dimensional space having the object 112 at the center. To be more precise, a virtual coordinate system is set in a virtual three-dimensional space, and it is assumed that a sphere with radius 1 having the point of origin of the virtual coordinate system at the center is provided. Points of a predetermined number M are approximately uniformly arranged on the surface of the sphere. Then, a direction in which the imaging is possible is calculated For example, according to a technique discussed in Japanese Patent Laid-Open No. 2007-156528, the points can be approximately uniformly arranged on the surface of the sphere. The points of the predetermined number M approximately uniformly arranged on the surface of the sphere may be an arbitrary number from, for example, 20 to about 100, and M=60 is employed in the present embodiment. Thus, 60 points are arranged on the surface of the sphere. Positions of these points in the virtual coordinate system in the virtual three-dimensional space are set as (Pxi, Pyi, Pzi) (i=1, 2, . . . , 60).

Step S502 is a similar direction determination step. According to this step, it is determined whether a point not yet used for imaging in a similar orientation exists. To be more precise, it is determined whether imaging in the orientation similar to the imaging orientation in the virtual three-dimensional space is already performed when it is assumed that the imaging is performed with an angle toward the center of the sphere from each point. First, it is simply assumed that the imaging unit 101 is arranged such that the imaging is performed with an angle toward the center of the sphere from each point. Then, the direction of an z'-axis 313 of the camera coordinate system illustrated in FIG. 3 in the virtual coordinate system at that time is obtained. Since the imaging is performed with an angle toward the center of the sphere from a point on the surface of the sphere, in other words, since the negative direction of the z'-axis 313 of the camera coordinate system passes through the center of the sphere, this direction will be the position of each point in the virtual coordinate system. For example, if the imaging unit 101 is arranged such that the image of the center of the sphere is captured from a certain point (Pxi, Pyi, Pzi), the direction of the z'-axis 313 of the camera coordinate system in the virtual coordinate system will be simply (Pxi, Pyi, Pzi). Then, from this direction and a plurality of imaging orientations whose imaging is already finished, a direction with respect to the measurement coordinate system having highest similarity with the direction of the z'-axis 313 of the camera coordinate system is searched and the similarity is obtained. An inner product of each of the two directions can be used in determining the similarity. Further, with respect to each imaging orientation whose imaging is already finished, a direction (Qx, Qy, Qz) of the z'-axis 313 in the camera coordinate system of the measurement coordinate system is obtained. If the rotational components of the imaging orientation data are the direction of the axis of rotation (Rx, Ry, Rz) and the rotation angle "theta", the direction (Qx, Qy, Qz) can be obtained from the following equation (1).

$$\begin{pmatrix} Qx \\ Qy \\ Qz \end{pmatrix} = \begin{pmatrix} Rx \cdot Rz(1-\cos\theta) + Ry \cdot \sin\theta \\ Ry \cdot Rz(1-\cos\theta) - Rx \cdot \sin\theta \\ Rz^2 + (1-Rz^2)\cos\theta \end{pmatrix} \quad (1)$$

In other words, inner product of the direction (Pxi, Pyi, Pzi) corresponding to the certain point arranged approximately uniformly on the surface of the sphere and the direction (Qx, Qy, Qz) acquired according to the above-described equation (1) by using a plurality pieces of imaging orientation data stored in the multi view-point image storage unit 104 is obtained. From the obtained inner products, an inner product with the largest value is obtained.

Then, it is determined whether the obtained greatest inner product value is equal to or greater than a predetermined reference value. If the greatest inner product value is equal to or greater than the predetermined reference value, it is determined that the imaging from the view point corresponding to the point arranged on the surface of the sphere is sufficient. If the greatest inner product value is equal to or smaller than the predetermined reference value, it is determined that the imaging from the view point corresponding to the point is missing. The predetermined reference value used for the determination can be an arbitrary value smaller than 1. For example, a value, 0.8, is used.

Step S503 is a dissimilar direction calculation step. In this step, as an imaging-missing view point, imaging orientation when the imaging is performed with an angle toward the center of the sphere from a point on the surface of the sphere is obtained. To be more precise, if it is determined that imaging is missing with respect to a certain point on the surface of the sphere, a direction (Pxi, Pyi, Pzi) corresponding to the point is determined as the imaging orientation corresponding to the imaging-missing view point. According to such processing, an imaging-missing view point is calculated.

In step S405, it is determined whether a missing position and orientation exists. If it is determined that imaging from view points corresponding to all the points arranged approximately uniformly on the surface of the sphere is sufficient (NO in step S405), the missing position and orientation calculation unit 105 determines that imaging of the measurement object body is evenly performed from various view points, and the processing ends.

On the other hand, if it is determined that imaging from a view point corresponding to one of the points arranged approximately uniformly on the surface of the sphere is missing (YES in step S405), the data (Pxi, Pyi, Pzi) corresponding to the imaging orientation is transmitted to the missing view-point image generation unit 106, and the processing proceeds to step S406.

In step S406, the missing view-point image generation unit 106 generates an image presenting the missing view point based on the data of the imaging orientation transmitted from the missing position and orientation calculation unit 105.

Figure 6:
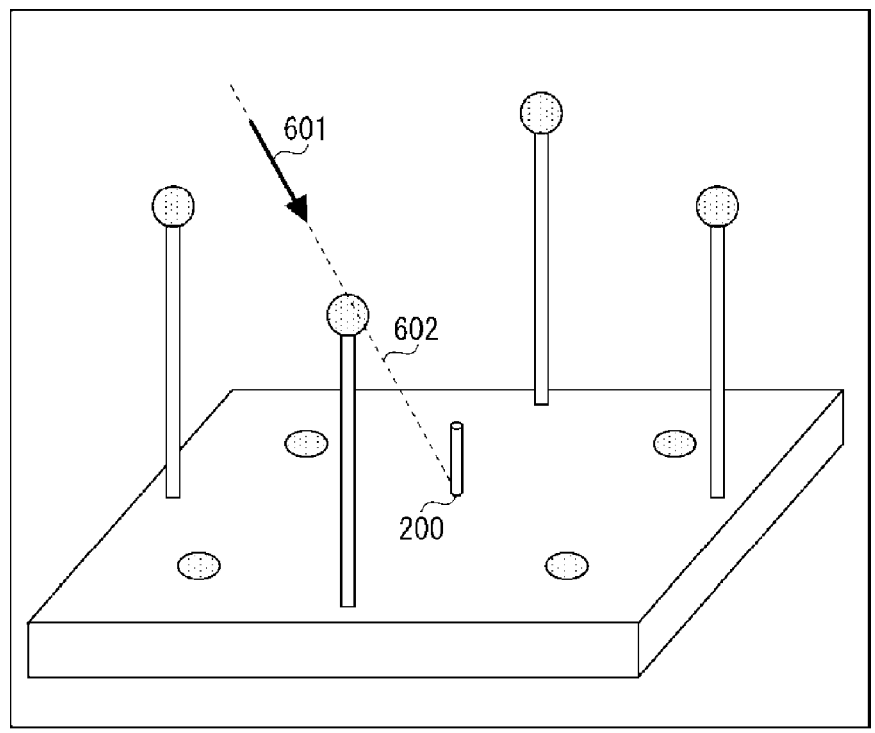
FIG. 6 illustrates an example of an image displayed on a display unit according to the first exemplary embodiment.

FIG. 6 illustrates an example of an image displayed on the display unit 107. An arrow 601 corresponds to an imaging orientation from an imaging-missing view point transmitted from the missing position and orientation calculation unit 105. The arrow 601 is on a dotted line 602. The dotted line 602 connects the point of origin 40 of the measurement coordinate system and the data (Pxi, Pyi, Pzi) regarding imaging orientation from the imaging-missing view point. According to the arrow 601, the missing view point can be confirmed. The missing view point can be expressed by a form other than an arrow so long as the user can understand the missing view point.

The user that performs the imaging of the measurement object body performs imaging from the missing view point displayed on the display unit 107. An image captured from the view point corresponding to the arrow 601 is transmitted from the imaging unit 101 to the image input unit 102, and the processing returns to step S401. In this manner, a multi view-point image composed of a great number of images obtained by evenly performing imaging from various view points is stored and a multi view-point image composed of a great number of images obtained by evenly performing imaging from various view points can be generated.

In step S407, the display unit 107 displays the image generated by the missing view-point image generation unit 106. In other words, the display unit 107 displays a position to which the imaging unit 101 is to be set and imaging of the object 112 is to be performed. The images of the object 112 captured evenly from various view points are stored in the multi view-point image storage unit 104, and the processing is continued until there are no missing view points.

According to the first exemplary embodiment, an example of a method for generating a multi view-point image composed of a great number of images of the measurement object body 112 captured evenly from various view points has been described.

A multi view-point image composed of a great number of images of the measurement object body 112 captured evenly from various view points is generated. However, it may be more useful to minutely perform imaging from an area in the vicinity of a predetermined view point depending on the measurement object. For example, with respect to a view point used in imaging a complex portion of the three-dimensional structure of the measurement object body, it is desirable to minutely perform the imaging compared to imaging of a portion having a simple structure. For example, by inputting data of a three-dimensional model of the measurement object body in advance and analyzing the data, a complex portion of the three-dimensional structure of the measurement object body is obtained. For example, if the measurement object body is a polygon, the complexity of the structure can be evaluated according to the number of sides of the polygon. Then, a view point used for imaging the complex portion of the three-dimensional structure of the measurement object body is obtained. Subsequently, out of a great number of points arranged approximately uniformly on the surface of a virtual sphere, a point in the vicinity of a point corresponding to a view point used for imaging the object body where the structure is complex is additionally generated. In this manner, the density of the points on the surface of the sphere in the vicinity of the view point that is used for imaging the complex portion of the structure will be higher. By using the plurality of points arranged on the surface of the virtual sphere, detailed images from view points used for capturing a complex portion of the structure can be captured.

In step S402, the relative position and orientation of the measurement object body and the imaging unit 101 is directly obtained. The method for obtaining the position and orientation of the imaging unit 101 is not limited to using a marker. For example, the position and orientation can be obtained in a way different from a captured image. By inputting a three-dimensional model of the measurement object body in advance and by comparing the characteristics when the three-dimensional model is projected on a two-dimensional image and the characteristics of the captured image, a relative position and orientation can be obtained. Further, the relative position and orientation of the imaging unit 101 and the object 112 can be obtained by estimating the relative position and orientation of the imaging unit and the object 112 from a three-dimensional model by using a technique discussed in nonpatent literature 2.

According to a second exemplary embodiment, an information processing method used for generating a multi view-point image used by a classifier will be described. When an image of an object is input, the classifier recognizes the orientation of the object. The information processing method is used for generating the multi view-point image which is used for the learning of the classifier.

Figure 7:
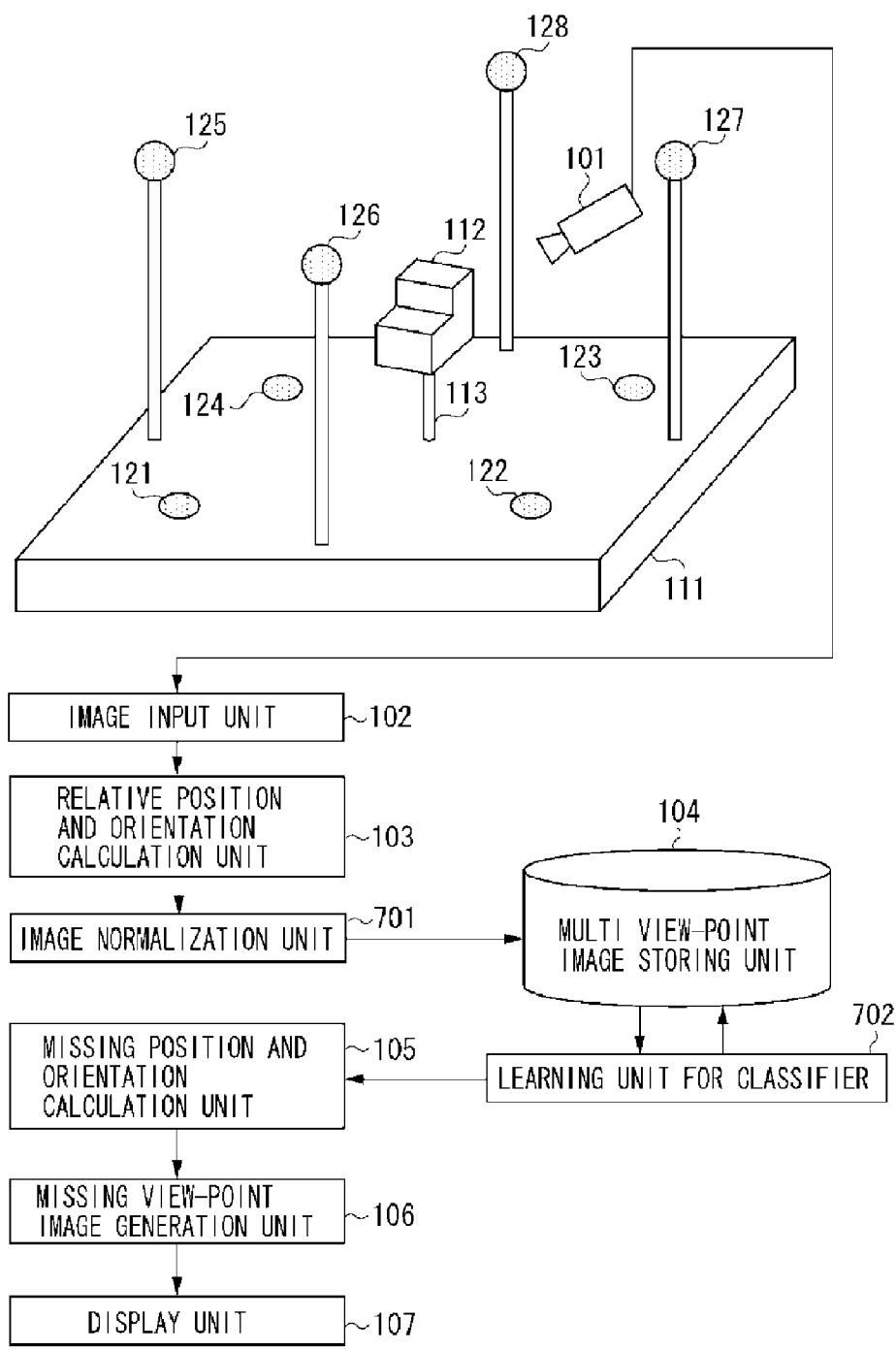
FIG. 7 is a configuration diagram according to a second exemplary embodiment.

FIG. 7 is a configuration diagram according to the present embodiment. The present embodiment includes the imaging unit 101, the image input unit 102, the relative position and orientation calculation unit 103, an image normalization unit 701, the multi view-point image storage unit 104, a classifier learning unit 702, the missing position and orientation calculation unit 105, the missing view-point image generation unit 106, and the display unit 107. Further, on the a measurement base 111 set in the real space, the object 112 which is a measurement object is set on the support 113. In the periphery of the object 112, a plurality of markers 121, 122, ..., 128 are arranged. Further, the eight markers of the markers 121 to 128 correspond to the color 1, color 2, ..., color 8 respectively. Further, the color 9 is set for regions other than the regions of the markers. The object 112 which is a measurement object does not include the colors 1 to 9. In the following description, regarding the above-described configuration, components different from those of the first exemplary embodiment are described and description of similar portions are not repeated.

The imaging unit 101 performs imaging of the object 112. The captured image is transmitted to the image input unit 102.

The image input unit 102 inputs the image transmitted from the imaging unit 101 to the relative position and orientation calculation unit 103. The image input by the image input unit 102 is transmitted to the relative position and orientation calculation unit 103.

The relative position and orientation calculation unit 103 calculates a relative position and orientation of the object 112 which is a measurement object and the imaging unit 101. The relative position and orientation of the object 112 and the imaging unit 101 calculated by the relative position and orientation calculation unit 103 is transmitted to the multi view-point image storage unit 104.

The image normalization unit 701 normalizes an image of the object 112 which is the measurement object into a unified format. To be more precise, an image of the measurement object is clipped from the input image. Then a gray-scale image of the clipped image is generated and the generated image is normalized into a predetermined size.

The multi view-point image storage unit 104 stores the imaging orientation data obtained by the relative position and orientation calculation unit 103 in association with the image according to which the measurement of the imaging orientation has been performed. The storing operation is repeated until the number of the imaging orientation data pieces reaches a predetermined number. The recorded imaging orientation data is transmitted to the classifier learning unit 702.

Based on a great number of images and imaging orientation data stored in the multi view-point image storage unit 104, the classifier learning unit 702 performs learning of the classifier that estimates the orientation of the object 112 which is included in the image.

The missing position and orientation calculation unit 105 calculates an imaging-missing view point at the current stage based on a great amount of imaging orientation data obtained by imaging by the current stage according to a result of estimation performed by the classifier which has performed learning according to the classifier learning unit 702.

The missing view-point image generation unit 106 generates an image showing the view point which is missing from the imaging orientation data of the missing view points calculated by the missing position and orientation calculation unit 105.

The display unit 107 displays the display image generated by the missing view-point image generation unit 106.

Figure 8:
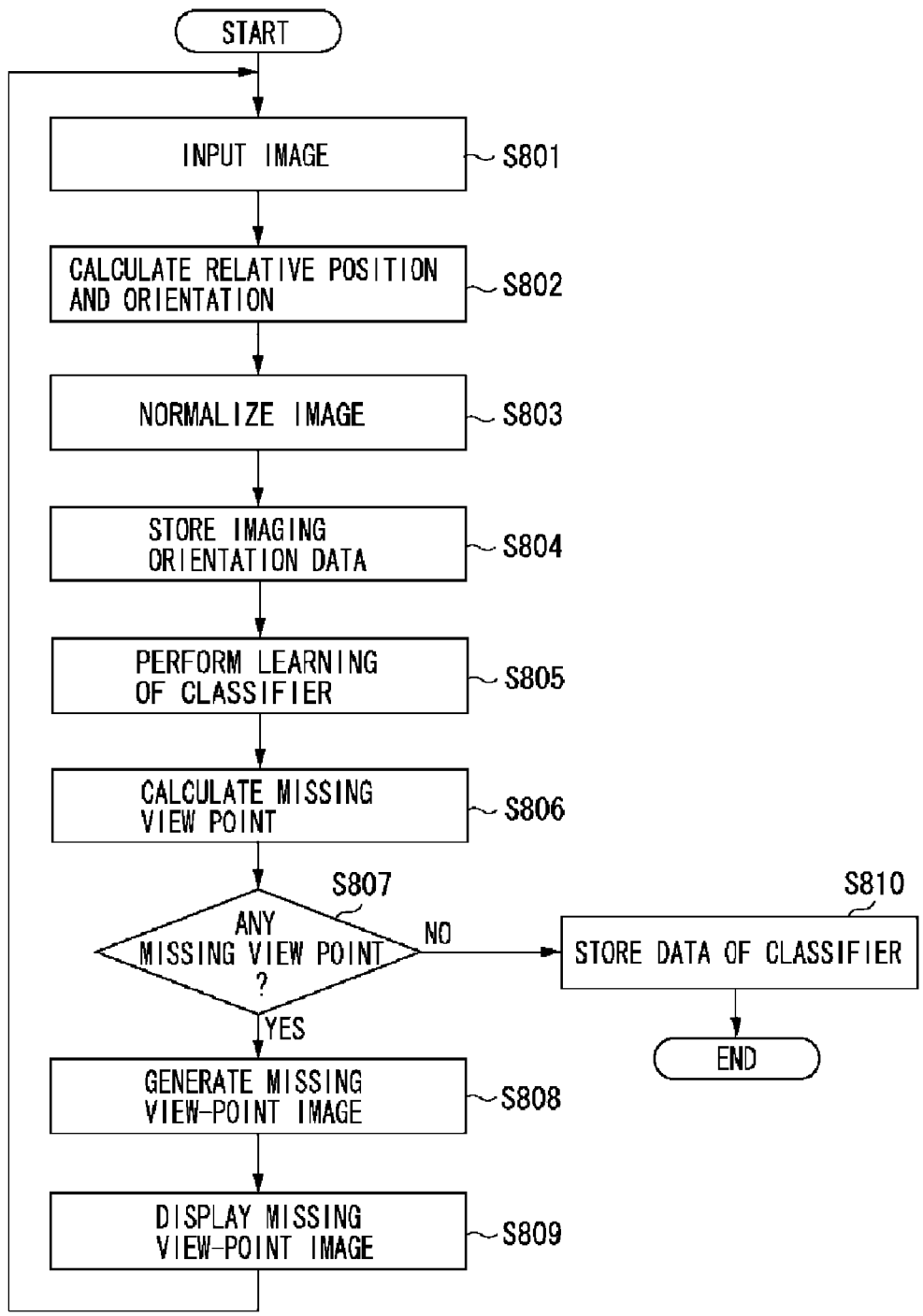
FIG. 8 is a flowchart illustrating processing according to the second exemplary embodiment.
Figure 9A:
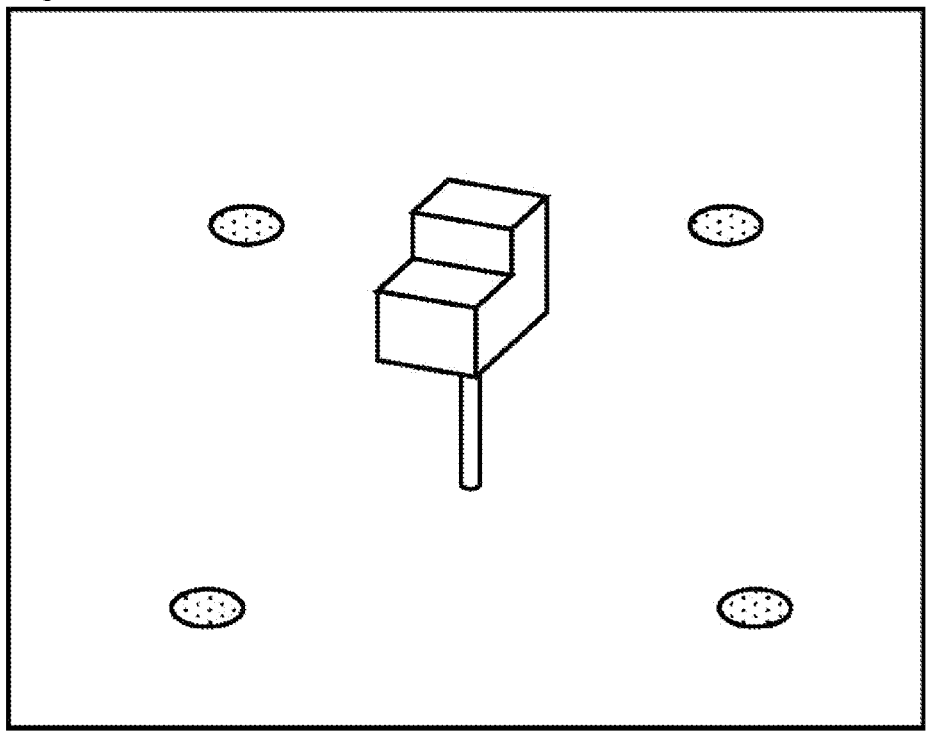
FIG. 9A illustrates an example of an image processed by an image normalization unit according to the second exemplary embodiment.
Figure 9B:
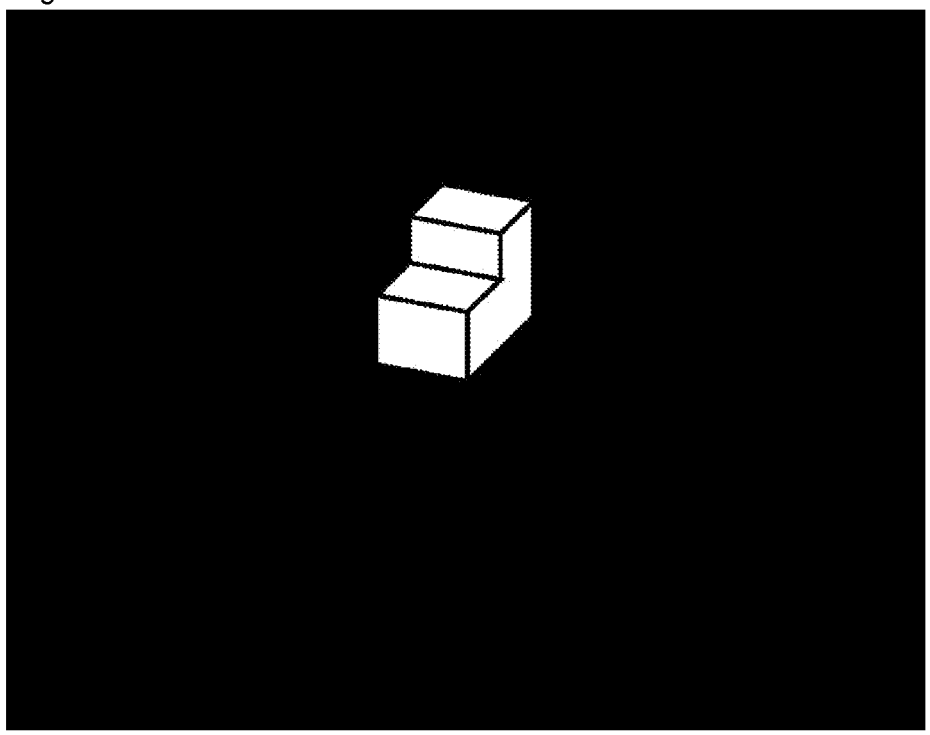
FIG. 9B illustrates an example of an image processed by an image normalization unit according to the second exemplary embodiment.
Figure 9C:
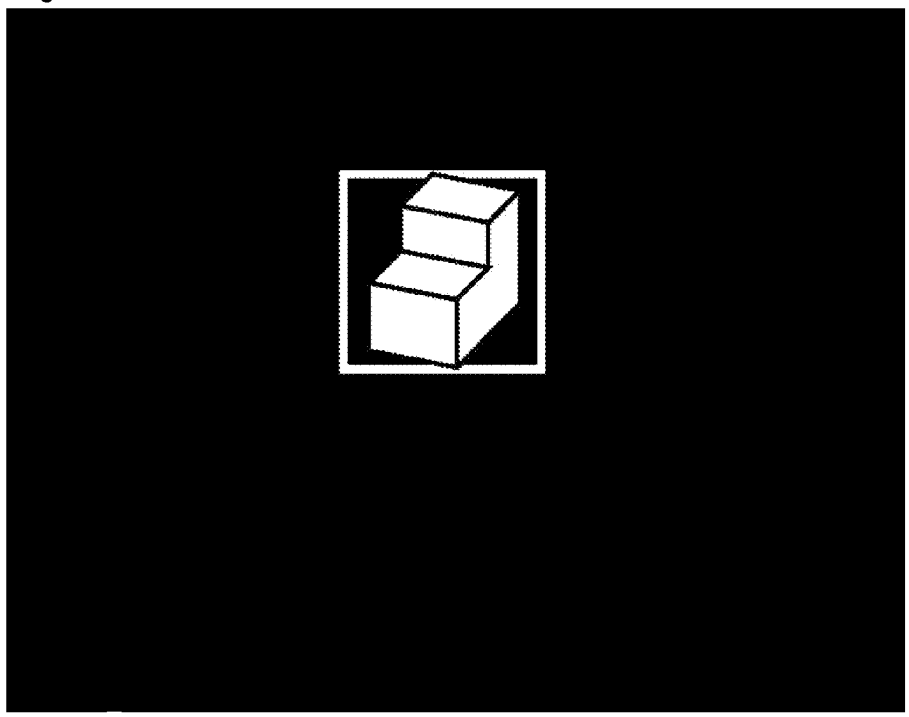
FIG. 9C illustrates an example of an image processed by an image normalization unit according to the second exemplary embodiment.
Figure 9D:
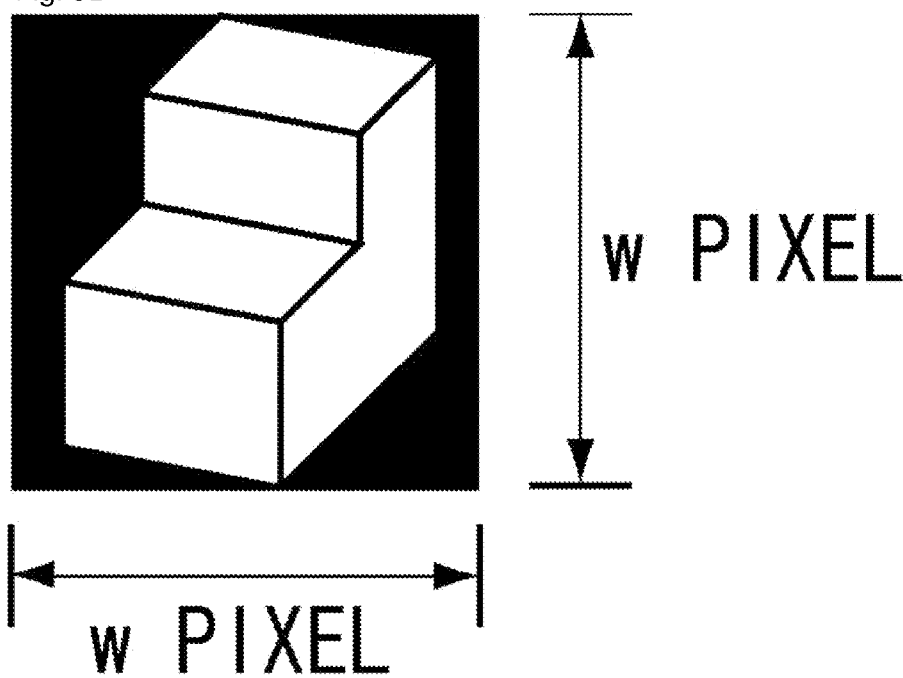
FIG. 9D illustrates an example of an image processed by an image normalization unit according to the second exemplary embodiment.

FIG. 8 is a flowchart illustrating processing flow of a multi view-point image generation method according to the present embodiment.

In step S801, the image input unit 102 inputs the image transmitted from the imaging unit 101. The image input by the image input unit 102 is transmitted to the relative position and orientation calculation unit 103 and then the processing proceeds to step S802.

In step S802, the relative position and orientation calculation unit 103 calculates a relative position and orientation of the object 112 which is a measurement object and the imaging unit 101.

In step S803, the image normalization unit 701 normalizes an image of the object 112 which is the measurement object into a unified format. To be more precise, an image of the object 112 which is the measurement object is clipped from the input image. Then a gray-scale image of the clipped image is generated and the generated image is normalized into a predetermined size.

FIG. 9 illustrates an example of an image processed by the image normalization unit 701. Details of the actual processing performed by the image normalization unit 701 in step S803 will be described. FIG. 9A illustrates an input image. Pixels of colors other than colors 1 to 8 being colors of the markers and the color 9 being the color assigned to the regions other than the regions of the markers in the input image, are extracted. As a result of the extraction, an image that extracts only the region of the object 112 which is the measurement object in FIG. 9B is generated. From this image, a circumscribing square region 9 is extracted and clipped as illustrated in FIG. 9C. Then, the color image of the clipped square region is changed into a gray scale image. As illustrated in FIG. 9D, the size of the image is normalized by expanding or reducing the image so that the width and the height of the clipped region is a predetermined length w pixels. An arbitrary value can be used for the predetermined length w pixels. By extracting a region whose color is different from the colors of the markers and the color other than the measurement system and is set to one color, the image normalization unit 701 clips the region of the object 112 which is the measurement object. However, the present invention is not limited to such a method and a different method can be used so long as a region of an object which is a measurement object can be clipped.

In step S804, the multi view-point image storage unit 104 stores the image which has undergone the normalization processing in association with the imaging orientation data calculated by the relative position and orientation calculation unit 103.

In step S805, the classifier learning unit 702 performs learning of the classifier that estimates the orientation of the object 112 included in the image based on a great number of images and imaging orientation data stored in the multi view-point image storage unit 104. With respect to the learning of the classifier, a plurality of images which have undergone processing such as object clipping performed by a clipping processing unit 702 and imaging orientation data corresponding to each of the images, which are stored in the multi view-point image storage unit 104, are used as learning data. For example, this classifier can be used for the estimation of orientation of a three-dimensional object of the support vector regression method discussed in nonpatent literature 3. The values predicted by the classifier use three values, that is, roll, pitch, and yaw as estimated values of the orientation of the object 112. To be more precise, the direction of the axis of rotation (Rx, Ry, Rz) and the value of the rotation angle "theta" that represent the rotational component of the imaging orientation data are estimated.

For example, by using a great number of images (gray scale images of 100×100 pixels) stored in the multi view-point image storage unit 104 and according to main component analysis, an eigenspace of the image group is obtained. Although the eigenspace is of an arbitrary dimension, it is desirable to determine the dimension using a cumulative contribution ratio. For example, a number of dimensions where the cumulative contribution ratio is 90% or greater is used as a number of dimensions d (<100×100) in the eigenspace. Then, data generated by projecting each of the great number of images which are stored, to an eigenspace of d-dimension is used as input data. The direction of the axis of rotation (Rx, Ry, Rz) that indicates a rotational component of the imaging orientation data corresponding to each of the great number of images and the rotation angle "theta" are used as target values when the learning of the support vector regression method is performed. If a clipped image of the object 112 by the image normalization unit is input, in the classifier based on the support vector regression method, an orientation of the measurement object body 112 is output. The classifier learning unit 702 is not limited to a classifier using the support vector regression method. For example, a classifier that estimates the orientation of the object 112 from an image of the object 112 which has been captured such as a parametric eigenspace method discussed in nonpatent literature 4 can also be used.

In step S806, the missing position and orientation calculation unit 105 calculates an imaging-missing view point at the current stage based on estimation capability of the classifier at the time the classifier has performed learning according to a classifier learning unit 702. For example, a predetermined number of points are approximately uniformly arranged on the surface of the sphere in the virtual three-dimensional space. A plurality of view points, from which imaging is performed with an angle toward the center of the sphere, is prepared. The plurality of view points are hereinafter referred to as virtual view points. Then, regarding each of the virtual view points, out of the plurality of pieces of imaging orientation data stored in the multi view-point image storage unit 104, two view points closest to the virtual view point are selected. These view points are hereinafter referred to as imaging-completed adjacent view points. An inner product value in the z'-axis direction in the camera coordinate system indicates the proximity of the view point. In this manner, the imaging-missing view point is calculated.

Figure 10:
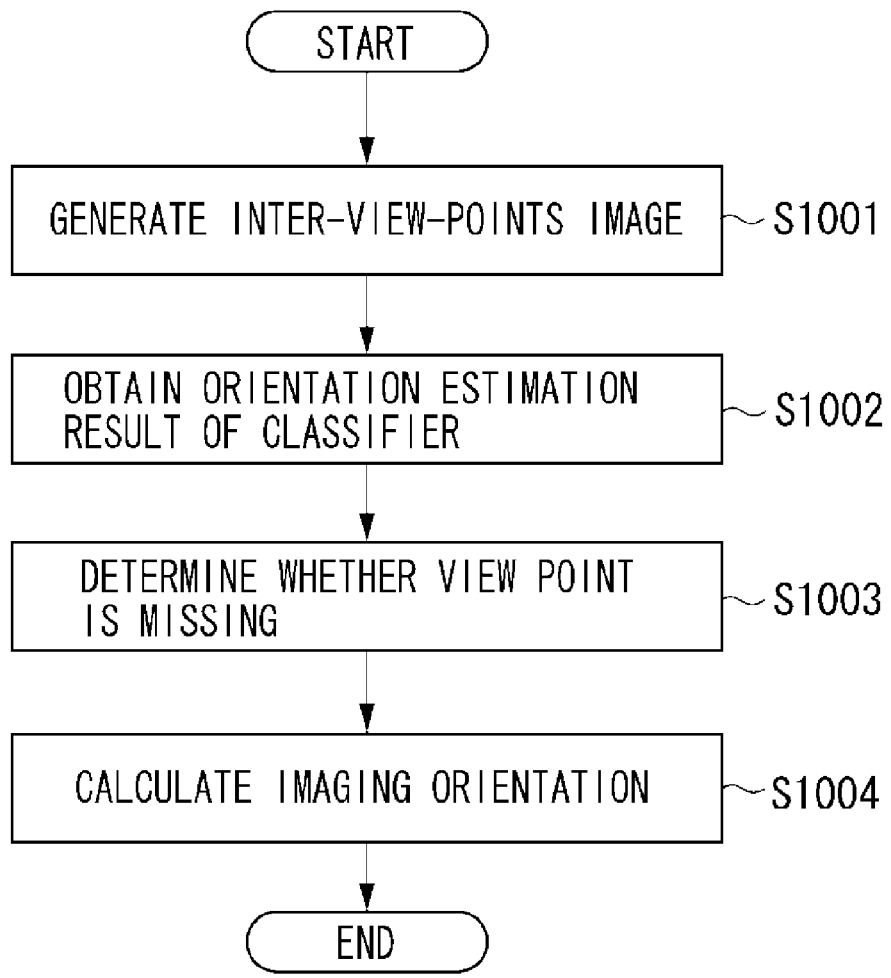
FIG. 10 is a flowchart illustrating processing performed by the missing position and orientation calculation unit according to the second exemplary embodiment.

FIG. 10 is a flowchart illustrating processing performed by the missing position and orientation calculation unit.

Details of actual processing performed by a missing position and orientation calculation unit 123 in step S806 will be described.

In step S1001, a predetermined number of points are approximately uniformly arranged on the surface of the sphere in the virtual three-dimensional space. A plurality of view points, from which imaging is performed with an angle toward the center of the sphere, is prepared. The plurality of view points are hereinafter referred to as virtual view points. Then, regarding each of the virtual view points, out of the plurality pieces of imaging orientation data stored in the multi view-point image storage unit 104, two view points closest to the virtual view point are selected. These view points are hereinafter referred to as imaging-completed adjacent view points. Regarding the proximity of the view point, it may be determined that the higher the value of the inner product in the z'-axis direction in the camera coordinate system, the closer the view point. Then, by using the image of the measurement object body 112 corresponding to the selected two imaging-completed adjacent view points, an estimated image of the measurement object body 112 when imaging is performed from a position corresponding to the virtual view point is generated. The estimated image is a virtual image of the measurement object body 112 when the measurement object body is observed from the above-described virtual view point. Any method can be used as the generation method of the estimated image so long as it can generate the above-described virtual image. Further, as is with the processing of the clip processing unit 702, a gray-scale image having the width and height of w pixels can be generated.

In step S1002, the image of the measurement object body 112 which is captured from the generated virtual view point is input to the classifier of the classifier learning unit 702, and the result of the orientation estimation performed by the classifier is obtained. To be more precise, a composite image of a measurement object body corresponding to imaging from a certain virtual view point is prepared, and with respect to the composite image, the classifier that has undergone the learning is applied, and a result of the orientation estimation of the object in the composite image is calculated.

In step S1003, if the result of the orientation estimation is not similar to the imaging orientation of an imaging system 71 when the imaging of the object is performed from a corresponding virtual view point, then it is determined that imaging is missing. Whether the orientation and the imaging orientation are similar or not, can also be determined according to whether a difference between the imaging orientation corresponding to the virtual view point and the result of the orientation estimation is equal to or smaller than a predetermined value. The difference between the two orientations can be considered as a rotation angle of one orientation when it is rotated so that it matches the other orientation.

FIG. 14 is a schematic diagram of an example of missing view point determination based on the result of the orientation estimation.

For example, from two images 1401 and 1402 corresponding to the imaging-completed adjacent view points, an image 1403 captured from a virtual view point which is a point corresponding to the middle of them is generated by using, for example, morphing. Then, the image is input to a discriminant function (e.g., multivalued nonlinear kernel regression function) which outputs the orientation of the object (direction of the axis of rotation and rotation angle) learned by using the acquired image. Whether the imaging data taken from the middle of the view points is missing is determined based on whether the orientation of the object which is output (estimated value) is within a predetermined range. In other words, it is determined whether an estimated orientation output 1404 of the middle of the view points (output of the discriminant function) is correct as a middle of the view points, and the missing view points are calculated. A curve in FIG. 14 schematically shows values (multivalues) of the correct orientation. If the orientation estimated output 1404 is an output close to the curve as illustrated in FIG. 14, it is determined that an image captured from a view point corresponding to the virtual view point is not missing. If the orientation estimated output 1404 is greatly different from the curve, it is determined that an image captured from a view point corresponding to the virtual view point is missing for the learning of the classifier.

In step S1004, an imaging orientation corresponding to the virtual view point which has been determined that imaging from that point is missing is obtained. For example, the position (Pxi, Pyi, Pzi) on the surface of the virtual sphere is obtained as the imaging orientation corresponding to the virtual view point.

In step S807, it is determined whether a missing position and orientation exists. If it is determined that imaging from view points corresponding to all the points arranged approximately uniformly on the surface of the sphere is sufficient (NO in step S807), the missing position and orientation calculation unit 105 determines that a multi view-point image of the measurement object body 112 is sufficiently captured for the learning of the classifier, and the processing proceeds to step S810. On the other hand, if it is determined that imaging from a view point corresponding to one of the points arranged approximately uniformly on the surface of the sphere is missing (YES in step S405), the data (Pxi, Pyi, Pzi) of the imaging orientation corresponding to the virtual view point determined as missing is transmitted to the missing view-point image generation unit 106, and the processing proceeds to step S808.

In step S808, the missing view-point image generation unit 106 generates an image presenting the missing view point based on the data of the imaging orientation transmitted from the missing position and orientation calculation unit 105.

In step S809, the display unit 107 displays the image generated by the missing view-point image generation unit 106.

In step S810, data of the classifier in a state where there are no missing view points is stored in the multi view-point image storage unit 104. To be more precise, a number of dimensions of the eigenspace related to the eigenspace on which imaging is performed and a basis vector corresponding to the number of dimensions, a plurality of support vectors, and a plurality of linear combination coefficients corresponding to the plurality of support vectors are stored in the multi view-point image storage unit 104.

According to the present embodiment, from images of a measurement object body, a multi view-point image composed of images necessary in the learning of the classifier that estimates the orientation can be generated. Further, since the classifier that performs arbitrary view point object recognition performs the learning by using the multi view-point image, the orientation of the object can be estimated by using the classifier.

According to the second exemplary embodiment, an example of a method for generating a multi view-point image used for learning of a classifier that recognizes orientation of an object whose image is captured is described.

According to an image generated by the missing viewpoint image generation unit 106 displayed on the display unit 107, the user performs imaging from the missing view point. However, in stead of the user performing the imaging, the imaging unit 101 can be mounted on a robot arm or the like. Then, the robot arm or the like can be moved to the missing view point and the imaging can be performed from the missing view point. In this case, data of the imaging orientation corresponding to the virtual view point which is determined as missing by the missing position and orientation calculation unit 105 is transmitted to an operation control unit of the robot arm or the like. Then, the operation control unit moves the robot arm based on the transmitted data of the imaging orientation. When the movement is completed, imaging by the imaging unit 101 is performed. In this way, the imaging from the missing view point can be performed and a multi view-point image sufficient for the learning of the classifier can be automatically obtained.

According to a third exemplary embodiment, an example of an information processing method for generating a multi view-point image used for generating a three-dimensional model of a measurement object body will be described.

Figure 11:
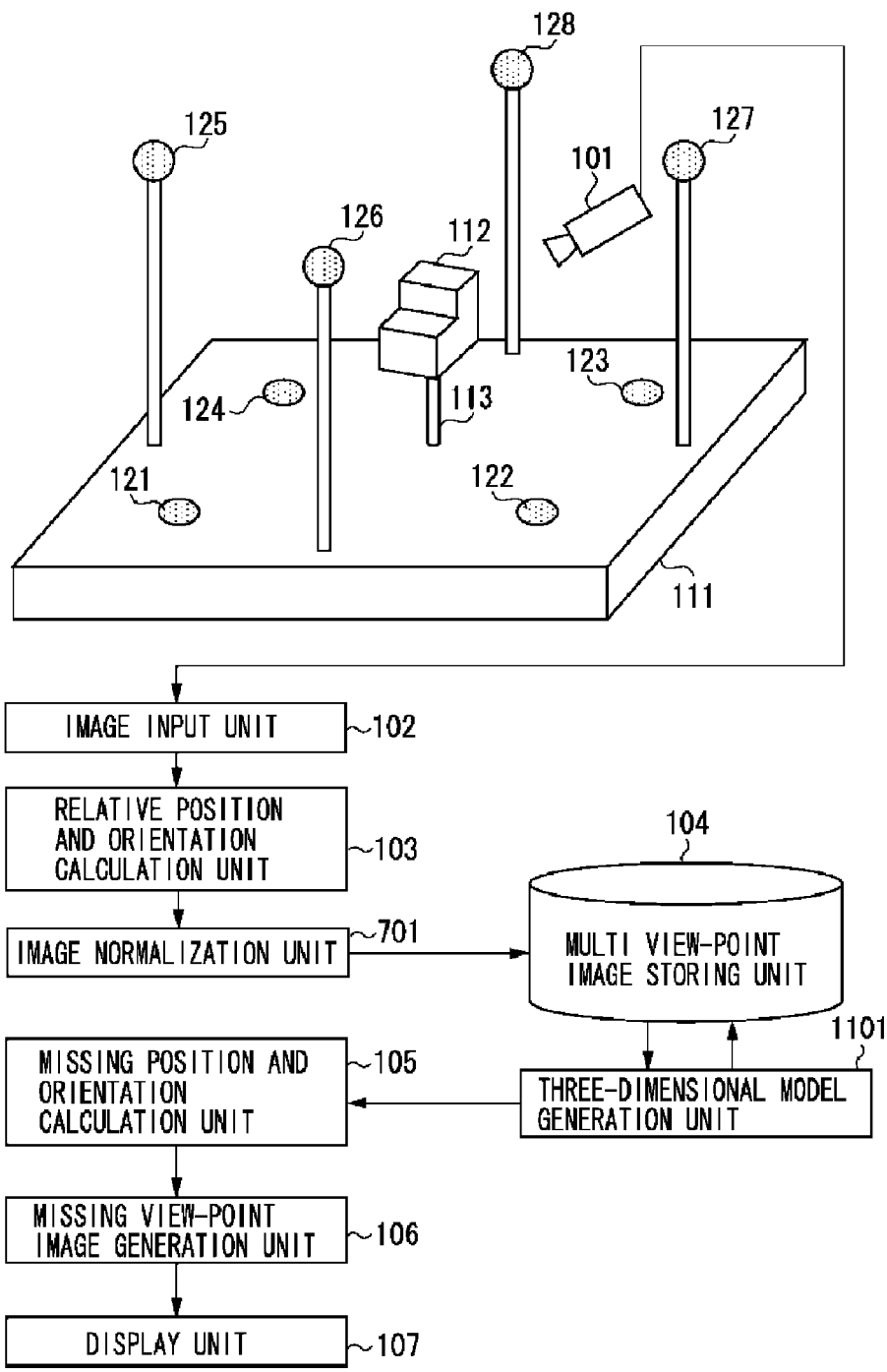
FIG. 11 is a configuration diagram according to a third exemplary embodiment.

FIG. 11 is a configuration diagram according to the present embodiment. The present embodiment includes the imaging unit 101, the image input unit 102, the relative position and orientation calculation unit 103, an image normalization unit 701, the multi view-point image storage unit 104, a three-dimensional model generation unit 1101, the missing position and orientation calculation unit 105, the missing view-point image generation unit 106, and the display unit 107. Further, on the a measurement base 111 set in the real space, the object 112 which is a measurement object is set on the support 113. In the periphery of the object 112, a plurality of markers 121, 122, ..., 128 are arranged. Further, the eight markers of the markers 121 to 128 correspond to the color 1, color 2, ..., color 8 respectively. Further, the color 9 is set for regions other than the regions of the markers. The object 112 which is a measurement object does not include the colors 1 to 9. In the following description, regarding the above-described configuration, only components different from those of the first exemplary embodiment are described and description of similar portions are not repeated.

The imaging unit 101 performs imaging of the object 112. The captured image is transmitted to the processing unit 12.

The image input unit 102 inputs the image transmitted from the imaging unit 101 to the processing unit 12. The image input by the image input unit 102 is transmitted to the relative position and orientation calculation unit 103.

The relative position and orientation calculation unit 103 calculates a relative position and orientation of the object 112 which is a measurement object and the imaging unit 101. The relative position and orientation of the object 112 and the imaging unit 101 calculated by the relative position and orientation calculation unit 103 is transmitted to the multi view-point image storage unit 104.

The image normalization unit 701 clips only the object 112 which is a measurement object from the input image. The clipped image is transformed into a gray scale image and normalized into a predetermined size.

The multi view-point image storage unit 104 stores the imaging orientation data obtained by the relative position and orientation calculation unit 103 in association with the image according to which the measurement of the imaging orientation has been performed.

The three-dimensional model generation unit 1101 generates a three-dimensional model of the measurement object body by using the images of the measurement object body 112 captured from a plurality of view points and stored in the multi view-point image storage unit 104.

Based on the generated three-dimensional model, the missing position and orientation calculation unit 105 calculates an imaging-missing view point at the current stage according to a great amount of imaging orientation data obtained by imaging performed by the current stage.

The missing view-point image generation unit 106 generates an image to be displayed from the imaging orientation data of the missing view points calculated by the missing position and orientation calculation unit 105.

The display unit 107 displays the display image generated by the missing view-point image generation unit 106.

Figure 12:
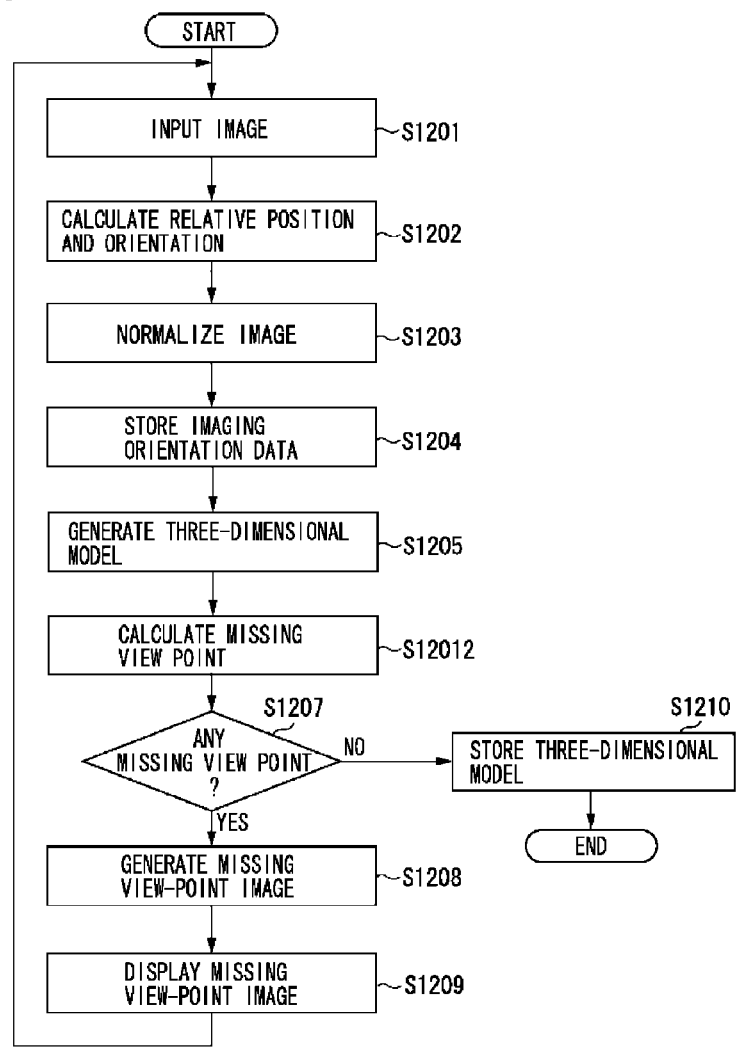
FIG. 12 is a flowchart illustrating processing according to the third exemplary embodiment.

FIG. 12 is a flowchart illustrating a multi view-point image generation method according to the present embodiment.

In step S1201, the image input unit 102 inputs the image transmitted from the imaging unit 101. The image input by the image input unit 102 is transmitted to the relative position and orientation calculation unit 103, and then the processing proceeds to step S1202.

In step S1202, the relative position and orientation calculation unit 103 calculates a relative position and orientation of the object 112 which is a measurement object and the imaging unit 101.

In step S1203, the image normalization unit 701 clips only the object 112 which is the measurement object from the input image. The clipped image is transformed into a gray scale image and normalized into a predetermined size.

In step S1204, the multi view-point image storage unit 104 stores the image whose object is clipped and has undergone the normalization processing in association with the imaging orientation data obtained by the relative position and orientation calculation unit 103.

In step S1205, the three-dimensional model generation unit 1101 generates a three-dimensional model of the measurement object body by using the images of the measurement object body 112 captured from a plurality of view points and stored in the multi view-point image storage unit 104. For example, by using a technique discussed in patent literature 4, a three-dimensional model of the object 112 captured from a plurality of view points is generated.

In step S1206, based on the three-dimensional model generated by the three-dimensional model generation unit 1101, the missing position and orientation calculation unit 105 calculates an imaging-missing view point at the current stage.

Figure 15:
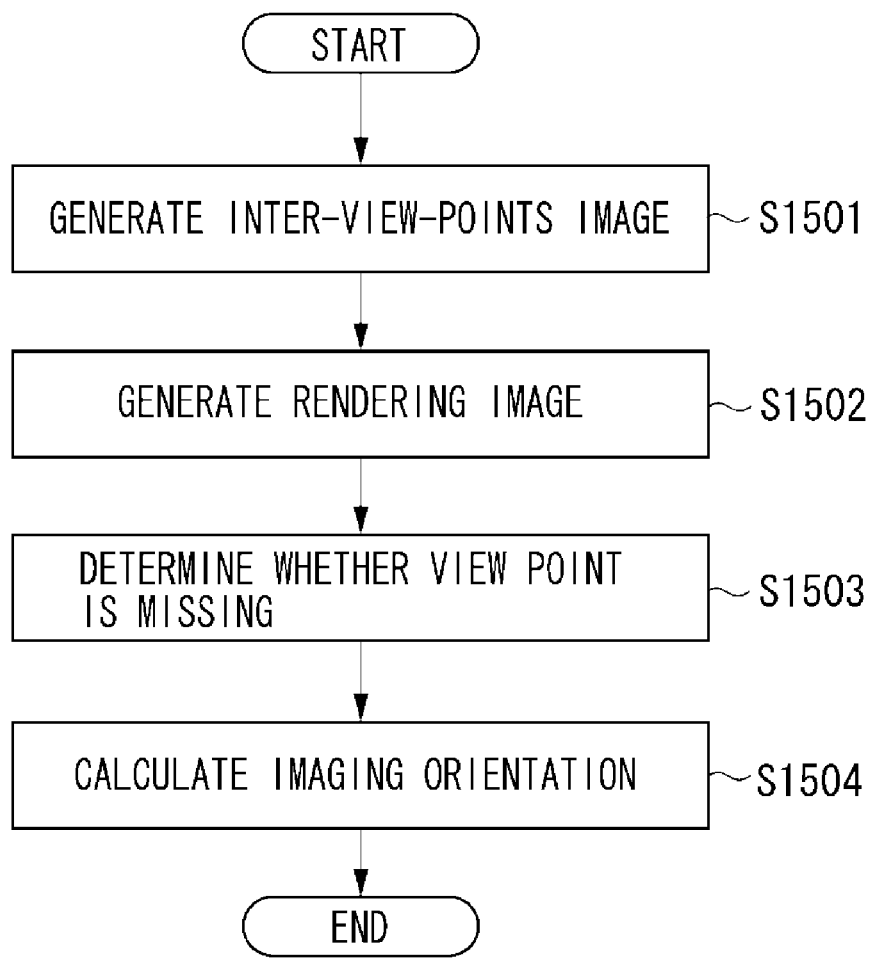
FIG. 15 is a flowchart illustrating processing performed by the missing position and orientation calculation unit according to the third exemplary embodiment.

FIG. 15 is a flowchart illustrating processing performed by the missing position and orientation calculation unit. Details of the actual processing performed by the missing position and orientation calculation unit 105 in step S1206 will be described.

In step S1501, first, a predetermined number of points are approximately uniformly arranged on the surface of a sphere in the virtual three-dimensional space and a virtual view point corresponding to each of such point is provided. Subsequently, two imaging-completed adjacent view points are selected for each virtual view point. Then, by using an image of the measurement object body 112 corresponding to the selected two imaging-completed adjacent view points, an estimated image of the measurement object body 112 is generated in a case where the imaging of the measurement object body is performed from a position corresponding to the virtual view point. The estimated image can also be generated, for example, by using view morphing method discussed in nonpatent literature 5.

In step S1502, a rendering image of the three-dimensional model which is generated by using the multi view-point image obtained by the current stage is generated. The rendering image of the three-dimensional model is generated by rendering the three-dimensional model generated by the three-dimensional model generation unit 1101 under a condition that the three-dimensional model is observed from each virtual view point. The rendering is a 3D-CG technique.

In step 1503, the estimated image and the rendering image corresponding to each virtual point are compared. If similarity of the two images is low, it is determined that imaging from that virtual view point is missing. The comparison of the two images is based on, for example, comparison of normalization correlation. If the value of the normalization correlation is equal to or lower than a predetermined value, it is determined that the similarity of the two images is low.

FIG. 13 is a schematic diagram of an example of the missing view point determination based on the comparison of two images.

For example, from two images 1301 and 1302 corresponding to the imaging-completed adjacent view points, an image 1303 captured from a virtual view point which is a point corresponding to the middle of them is generated by using, for example, a view-point morphing method. Further, a rendering image 1304 is generated by rendering the three-dimensional model generated by using the multi view-point images obtained by the current stage according to projection under the condition that the observation is made from the middle of the view points. Then, by comparing the two images, based on whether their similarity (e.g., normalization correlation value of the result of the edge extraction) is equal to or greater than a predetermined value, whether imaging data of that middle of the view points is missing or not is determined. In other words, if a difference 1305 between the estimated image 1303 which is generated according to the view point morphing method or the like and the rendering image 1304 is great, it is determined that a corresponding view point is missing.

In step S1504, an imaging orientation corresponding to the virtual view point about which it has been determined that imaging from that point is missing is obtained. For example, the position (Pxi, Pyi, Pzi) on the surface of the virtual sphere is obtained as the imaging orientation corresponding to the virtual view point.

In step S1207, it is determined whether a missing position and orientation exists. If it is determined that imaging from view points corresponding to all the points arranged approximately uniformly on the surface of the sphere is sufficient (NO in step S807), the missing position and orientation calculation unit 105 determines that imaging of a multi view-point image of the measurement object body 112 is sufficiently captured for the generation of the three-dimensional model, and the processing proceeds to step S1210. On the other hand, if it is determined that the imaging from a view point corresponding to one of the points arranged approximately uniformly on the surface of the sphere is missing (YES in step S405), the data (Pxi, Pyi, Pzi) of the imaging orientation is transmitted to the missing view-point image generation unit 106, and the processing proceeds to step S1208.

In step S1208, the missing view-point image generation unit 106 generates an image indicating the missing view point based on the data of the imaging orientation sent from the missing position and orientation calculation unit 105.

In step S1209, the display unit 107 displays the image generated by the missing view-point image generation unit 106.

In step S1210, the three-dimensional model generation unit 1101 generates a three-dimensional model of the measurement object body 112 from a plurality of images with no missing view points and stores the generated three-dimensional model in the multi view-point image storage unit 104.

A multi view-point image composed of a great number of images necessary for generating a three-dimensional model for generating a three-dimensional model of an object can be generated.

By mounting the imaging unit 101 on a robot arm or the like and moving the robot arm or the like to a missing view point and performing the imaging from the missing view point, a multi view-point image sufficient for the generation of the three-dimensional model can be automatically obtained.

According to the third exemplary embodiment, an example of a multi view-point image generation method used for generating a three-dimensional model of a measurement object body is described.

Other Exemplary Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-040596 filed Feb. 25, 2010, which is hereby incorporated by reference herein in its entirety.

The invention claimed is:

1. An information processing apparatus comprising:
a memory; and
a processor coupled to the memory which executes the following:
obtaining a plurality of relative positions and orientations with respect to an object relative to an imaging unit for each of a plurality of view points based on a plurality of images captured by imaging the object from the plurality of view points by the imaging unit;
deriving, as a lacking relative position and orientation, a relative position and orientation of the imaging unit from which imaging by the imaging unit is lacking with respect to the object based on the obtained plurality of relative positions and orientations; and
outputting information which indicates the derived lacking relative position and orientation,
wherein the deriving includes:
setting a plurality of virtual relative positions and orientations from which the object is imaged approximately uniformly with the object at a center;
determining whether each of the virtual relative positions and orientations is similar to at least one of the obtained relative positions and orientations; and
deriving the lacking relative position and orientation based on the virtual relative positions and orientations to each of which it is not determined that any of the obtained relative positions and orientations is similar.

2. The information processing apparatus according to claim 1, wherein the determining is performed based on an inner product of a vector connecting the virtual positions and orientations with the object and a vector connecting the relative positions and orientations with the object.

3. The information processing apparatus according to claim 1, wherein the captured image includes a plurality of markers arranged on the object and in a periphery of the object, and three-dimensional positions of the plurality of markers in a real space are known.

4. The information processing apparatus according to claim 3, each of a plurality of markers has a color different from a color of the object and the plurality of markers which are different from a marker.

5. The information processing apparatus according to claim 3, wherein obtaining the relative position and orientation with respect to the object relative to the imaging unit is performed by detecting positions of the plurality of markers in the captured image.

6. The information processing apparatus according to claim 3, positions of the detected plurality of markers are four or more.

7. The information processing apparatus according to claim 1, wherein obtaining the relative position and orientation with respect to the object relative to the imaging unit for each of the plurality of positions and orientations is performed by comparing characteristics of the three-dimensional model of the object stored in advance and characteristics of the object in the captured image.

8. The information processing apparatus according to claim 1, wherein the deriving further includes deriving, if the obtained relative position and orientation from a position in a vicinity of a relative position and orientation which can be used in imaging a complex structure of a three-dimensional model of the object stored in advance is small in number, a relative position and orientation in the vicinity of the relative position and orientation which can be used in imaging a complex structure as a lacking relative position and orientation.

9. The information processing apparatus according to claim 1, the apparatus further comprises an imaging moving unit used for moving the imaging unit.

10. The information processing apparatus according to claim 1, further comprising:
a display unit to display the generated image.

11. The information processing apparatus according to claim 1, wherein in the outputting, an image indicating the lacking relative position and orientation is generated and the generated image is output to a display unit.

12. An information processing apparatus comprising:
a memory;
a processor coupled to the memory which executes the following:
obtaining a plurality of images, of an object, captured by an imaging unit and a relative position and orientation of the imaging unit, with respect to the object, for each of the plurality of captured images;
generating a classifier for estimating an orientation of the object in an image based on the obtained plurality of images and the obtained relative positions and orientations of the imaging unit;
generating an image capable of being observed in a case where observation of the object is performed in a first relative position and orientation which is different from any of the obtained relative positions and orientations;
deriving, in a case where classification accuracy of when the classifier is applied to the generated image is lower than a threshold value, the first relative position and orientation as a lacking relative position and orientation; and
outputting information indicating the derived lacking relative position and orientation.

13. The information processing apparatus according to claim 12, further comprises normalizing the plurality of captured images in a unified format, and the classifier allows learning of the plurality of captured images which have been normalized.

14. The information processing apparatus according to claim 12, further comprising deriving the lacking relative position and orientation by comparing the relative position and orientation and an orientation of the object in the generated image, which is estimated based on the classifier.

15. The information processing apparatus according to claim 12, wherein the first relative position and orientation is an intermediate position and orientation of the obtained relative positions and orientations used for imaging the plurality of captured images learned by the classifier.

16. The information processing apparatus according to claim 12, wherein the plurality of captured images learned by the classifier are two captured images.

17. The information processing apparatus according to claim 12, further comprising generating an image indicating the lacking relative position and orientation and output the generated image to a display unit.

18. An information processing apparatus comprising:
a memory;
a processor coupled to the memory which executes the following:
obtaining a plurality of images, of an object, captured by an imaging unit and a relative position and orientation of the imaging unit, with respect to the object, for each of the plurality of captured images;
generating an approximately three-dimensional model based on the obtained plurality of images and the obtained relative positions and orientations of the imaging unit;
generating, based on the obtained image, an image capable of being observed in a case where observation is performed in a second relative position and orientation which is different from the obtained relative position and orientation;
performing rendering to generate an image, which is to be observed from the second relative position and orientation, based on the approximately three-dimensional model;
deriving, in a case where a degree of similarity between the generated image and the image generated by rendering is lower than a threshold value, the second relative position and orientation as a lacking relative position and orientation; and
outputting information indicating the derived lacking relative position and orientation.

19. The information processing apparatus according to claim 18, further comprising generating an image indicating the lacking relative position and orientation and output the generated image to a display unit.

20. An information processing method comprising:
obtaining a plurality of relative positions and orientations with respect to an object relative to an imaging unit for each of a plurality of view points based on a plurality of images captured by imaging the object from the plurality of view points by an imaging unit;
deriving, as a lacking relative position and orientation, a relative position and orientation of the imaging unit from which imaging by the imaging unit is lacking with respect to the object based on the obtained plurality of relative positions and orientations; and
outputting information which indicates the derived lacking relative position and orientation,
wherein the deriving includes:
setting a plurality of virtual relative positions and orientations from which the object is imaged approximately uniformly with the object at a center;
determining whether each of the virtual relative positions and orientations is similar to at least one of the obtained relative positions and orientations; and
deriving the lacking relative position and orientation based on the virtual relative positions and orientations to each of which it is not determined that any of the obtained relative positions and orientations is similar.

21. A non-transitory storage medium storing a computer-executable program configured to allow a computer to execute the information processing method according to claim 20.

22. An information processing method comprising:
obtaining a plurality of images, of an object, captured by an imaging unit and a relative position and orientation of the imaging unit, with respect to the object, for each of the plurality of captured images;
generating a classifier for estimating an orientation of the object in an image based on the obtained plurality of images and the obtained relative positions and orientations of the imaging unit;
generating an image capable of being observed in a case where observation of the object is performed in a first relative position and orientation which is different from any of the obtained relative positions and orientations;
deriving, in a case where classification accuracy of when the classifier is applied to the generated image is lower than a threshold value, the first relative position and orientation as a lacking relative position and orientation; and
outputting information indicating the derived lacking relative position and orientation.

23. A non-transitory storage medium storing a computer-executable program configured to allow a computer to execute the information processing method according to claim 22.

24. An information processing method comprising:
obtaining a plurality of images, of an object, captured by an imaging unit and a relative position and orientation of the imaging unit, with respect to the object, for each of the plurality of captured images;
generating an approximately three-dimensional model based on the obtained plurality of images and the obtained relative positions and orientations of the imaging unit;
generating, based on the obtained image, an image capable of being observed in a case where observation is performed in a second relative position and orientation which is different from the obtained relative position and orientation;
performing rendering to generate an image, which is to be observed from the second relative position and orientation, based on the approximately three-dimensional model;
deriving, in a case where a degree of similarity between the generated image and the image generated by rendering is lower than a threshold value, the second relative position and orientation as a lacking relative position and orientation; and
outputting information indicating the derived lacking relative position and orientation.

25. A non-transitory storage medium storing a computer-executable program configured to allow a computer to execute the information processing method according to claim 24.

* * * * *